US011377120B1

(12) United States Patent
Deng et al.

(10) Patent No.: US 11,377,120 B1
(45) Date of Patent: Jul. 5, 2022

(54) AUTONOMOUS VEHICLE CONTROL BASED ON RISK-BASED INTERACTIONS

(71) Applicant: UATC, LLC, San Francisco, CA (US)

(72) Inventors: Eric Chen Deng, Fremont, CA (US); Micol Marchetti-Bowick, Pittsburgh, PA (US); Yasmine Straka Concilio, Pittsburgh, PA (US); Galen Clark Haynes, Pittsburgh, PA (US); Michael Lee Phillips, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 123 days.

(21) Appl. No.: 16/863,341

(22) Filed: Apr. 30, 2020

Related U.S. Application Data

(60) Provisional application No. 62/983,204, filed on Feb. 28, 2020.

(51) Int. Cl.
*B60W 60/00* (2020.01)
*B60W 30/095* (2012.01)
(Continued)

(52) U.S. Cl.
CPC ........ *B60W 60/0015* (2020.02); *B60W 10/18* (2013.01); *B60W 10/20* (2013.01);
(Continued)

(58) Field of Classification Search
CPC ........ B60W 60/0015; B60W 30/0956; B60W 60/0027; B60W 2520/10; B60W 2552/05;
(Continued)

(56) References Cited

U.S. PATENT DOCUMENTS

| 2020/0156631 A1* | 5/2020 | Lin ...................... G05D 1/0255 |
| 2021/0031760 A1* | 2/2021 | Ostafew ............... G05D 1/0214 |
| 2021/0070286 A1* | 3/2021 | Green ................... B60W 30/09 |

FOREIGN PATENT DOCUMENTS

EP  3699053 A1 *  8/2020  ........ B60W 50/0097

OTHER PUBLICATIONS

Phan-Minh et al., :Towards Assume-Guarantee Profiles For Autonomous Vehicles, Conference on Decision and Control (CPC), 2019, 10 pages.

* cited by examiner

*Primary Examiner* — Nadeem Odeh
(74) *Attorney, Agent, or Firm* — Dority & Manning, P.A.

(57) ABSTRACT

Systems, methods, tangible non-transitory computer-readable media, and devices associated with vehicle control based on risk-based interactions are provided. For example, vehicle data and perception data can be accessed. The vehicle data can include the speed of an autonomous vehicle in an environment. The perception data can include location information and classification information associated with an object in the environment. A scenario exposure can be determined based on the vehicle data and perception data. Prediction data including predicted trajectories of the object can be accessed. Expected speed data can be determined based on hypothetical speeds and hypothetical distances between the vehicle and the object. A speed profile that satisfies a threshold criteria can be determining based on the scenario exposure, the prediction data, and the expected speed data, over a distance. A motion plan to control the autonomous vehicle can be generated based on the speed profile.

20 Claims, 19 Drawing Sheets

(51) Int. Cl.
*B60W 30/16* (2020.01)
*G08G 1/00* (2006.01)
*B60W 10/20* (2006.01)
*B60W 10/18* (2012.01)

(52) U.S. Cl.
CPC ........ *B60W 30/0956* (2013.01); *B60W 30/16* (2013.01); *B60W 60/0027* (2020.02); *G08G 1/20* (2013.01); *B60W 2520/10* (2013.01); *B60W 2552/05* (2020.02); *B60W 2554/80* (2020.02); *B60W 2720/103* (2013.01)

(58) Field of Classification Search
CPC ....... B60W 2554/80; B60W 2720/103; B60W 10/18; B60W 10/20; B60W 30/16; G08G 1/20
USPC .......................................................... 701/25
See application file for complete search history.

| Scenario Parameter | (Hypothetical) Discrete Value |
|---|---|
| First Detection SDV speed | 25 km/h |
| First Detection Distance to Ped | 40 m |
| SDV Speed at (Decision Horizon + 10m) | 25 km/h |
| Object Lat Speed at (Decision Horizon + 10m) | 0 m/s |
| Object Distance at (Decision Horizon + 10m) | 4 m |
| Object Heading at (Decision Horizon + 10m) | 0 (Ahead/ Along road) |

FIG. 4

|  | Lowest Severity | Intermediate Severity | Highest Severity |
|---|---|---|---|
| Total Interactions | 5000 | 10000 | 15000 |
| Projected SD | 100 | 500 | 0 |
| Interactions per Kilometer | 0.000005 | 0.00004 | 0.0003 |
| Total Kilometers | 500000000 | 400000000 | 300000000 |
| Threshold | 5xe-6 | 4xe-5 | 3xe-4 |

FIG. 6

| Initial Speed (km/h) | Outcome Severity Level (% Likelihood) | | | | |
| --- | --- | --- | --- | --- | --- |
| | S0 Lowest Severity | S1 Intermediate Severity | S2 Intermediate Severity | S3 Intermediate Severity | S4 Highest Severity |
| 10 | 0.08 | 0.3 | 0.3 | 0.3 | 0.02 |
| 20 | 0.08 | 0.25 | 0.25 | 0.4 | 0.02 |
| 30 | 0.08 | 0.35 | 0.45 | 0.1 | 0.02 |
| 40 | 0.08 | 0.15 | 0.6 | 0.15 | 0.02 |
| 50 | 0.08 | 0.15 | 0.3 | 0.3 | 0.02 |

| Severity | Description | Occurrence per kilometer |
|---|---|---|
| S0 | Lowest severity | 5xe-6 |
| S1 | Intermediate severity | 4xe-5 |
| S2 | Intermediate severity | 4xe-5 |
| S3 | Intermediate severity | 4xe-5 |
| S4 | Highest severity | 3xe-4 |

FIG. 11

AUTONOMOUS VEHICLE CONTROL BASED ON RISK-BASED INTERACTIONS

RELATED APPLICATION

The present application is based on and claims benefit of U.S. Provisional Patent Application No. 62/983,204 having a filing date of Feb. 28, 2020, which is incorporated by reference herein.

FIELD

The present disclosure relates generally to determining risks in an environment and using the determined risks as part of controlling a vehicle in real-time.

BACKGROUND

Vehicles, including autonomous vehicles, can receive data that is used to determine the state of an environment through which the vehicle travels. This data can be associated with various representations of the environment including objects that are present in the environment. As the state of the environment is dynamic, and the objects that are present in the environment can change over time, operation of a vehicle may rely on an accurate determination of the state of the representations of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of autonomous vehicle control. The computer-implemented method can include accessing, by a computing system including one or more computing devices, vehicle data and perception data. The vehicle data can include a speed of an autonomous vehicle in an environment. The perception data can include location information and classification information associated with an object in the environment. The computer-implemented method can include determining, by the computing system, a scenario exposure based at least in part on the vehicle data and the perception data. The scenario exposure can represent a probability of a potential interaction between the autonomous vehicle and the object. The computer-implemented method can include accessing, by the computing system, prediction data including one or more predicted trajectories for the object over a future time interval. The computer-implemented method can include determining, by the computing system and based at least in part on (i) a plurality of hypothetical speeds of the autonomous vehicle and (ii) a plurality of hypothetical distances between the autonomous vehicle and the object, expected speed data including a plurality of expected speeds of the autonomous vehicle. Each expected speed can represent a speed of the autonomous vehicle when the autonomous vehicle is at least a hypothetical distance from a predicted location of the object at a future time based at least in part on the prediction data. The computer-implemented method can include determining, by the computing system and based at least in part on (i) the scenario exposure, (ii) the prediction data, and (iii) the expected speed data, a speed profile for the autonomous vehicle over a distance. The speed profile can satisfy a set of threshold criteria. Furthermore, the computer-implemented method can include generating, by the computing system and based on the speed profile, a motion plan for controlling a movement of the autonomous vehicle.

Another example aspect of the present disclosure is directed to a computing system including: one or more processors; a memory including one or more computer-readable media, the memory storing computer-readable instructions that when executed by the one or more processors cause the one or more processors to perform operations. The operations can include accessing vehicle data and perception data. The vehicle data can include a speed of an autonomous vehicle in an environment. The perception data can include location information and classification information associated with an object in the environment. The operations can include determining a scenario exposure based at least in part on the vehicle data and the perception data. The scenario exposure can represent a probability of a potential interaction between the autonomous vehicle and the object. The operations can include accessing prediction data including one or more predicted trajectories for the object over a future time interval. The operations can include determining and based at least in part on (i) a plurality of hypothetical speeds of the autonomous vehicle and (ii) a plurality of hypothetical distances between the autonomous vehicle and the object, expected speed data including a plurality of expected speeds of the autonomous vehicle. Each expected speed can represent a speed of the autonomous vehicle when the autonomous vehicle is at least a hypothetical distance from a predicted location of the object at a future time based at least in part on the prediction data. The operations can include determining and based at least in part on (i) the scenario exposure, (ii) the prediction data, and (iii) the expected speed data, a speed profile for the autonomous vehicle over a distance. The speed profile can satisfy a set of threshold criteria. Furthermore, the operations can include generating and based on the speed profile, a motion plan for controlling a movement of the autonomous vehicle.

Another example aspect of the present disclosure is directed to an autonomous vehicle including: one or more processors; a memory including one or more computer-readable media, the memory storing computer-readable instructions that when executed by the one or more processors cause the one or more processors to perform operations. The operations can include accessing vehicle data and perception data. The vehicle data can include a speed of an autonomous vehicle in an environment. The perception data can include location information and classification information associated with an object in the environment. The operations can include determining a scenario exposure based at least in part on the vehicle data and the perception data. The scenario exposure can represent a probability of a potential interaction between the autonomous vehicle and the object. The operations can include accessing prediction data including one or more predicted trajectories for the object over a future time interval. The operations can include determining and based at least in part on (i) a plurality of hypothetical speeds of the autonomous vehicle and (ii) a plurality of hypothetical distances between the autonomous vehicle and the object, expected speed data including a plurality of expected speeds of the autonomous vehicle. Each expected speed can represent a speed of the autonomous vehicle when the autonomous vehicle is at least a hypothetical distance from a predicted location of the object at a future time based at least in part on the prediction data. The operations can include determining and based at least in part on (i) the scenario exposure, (ii) the prediction data, and (iii) the expected speed data, a speed profile for the autonomous vehicle over a distance. The speed profile can satisfy a set of threshold criteria. Furthermore, the operations can include generating and based on the speed profile, a motion plan for controlling a movement of the autonomous vehicle.

Other example aspects of the present disclosure are directed to other systems, methods, vehicles, apparatuses, tangible non-transitory computer-readable media, and devices for autonomous vehicle control.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 depicts an example of determining scenario exposure according to example embodiments of the present disclosure;

FIG. 6 depicts an example of outcome severity likelihood thresholds according to example embodiments of the present disclosure;

FIG. 8 depicts an example of diagrams showing a relationship between the severity and velocity of vehicle interactions with an object according to example embodiments of the present disclosure;

FIG. 9 depicts an example of expected speed data according to example embodiments of the present disclosure;

FIG. 11 depicts an example of the frequency of the occurrence of potential interactions at different severity levels according to example embodiments of the present disclosure;

DETAILED DESCRIPTION

Figure 1:
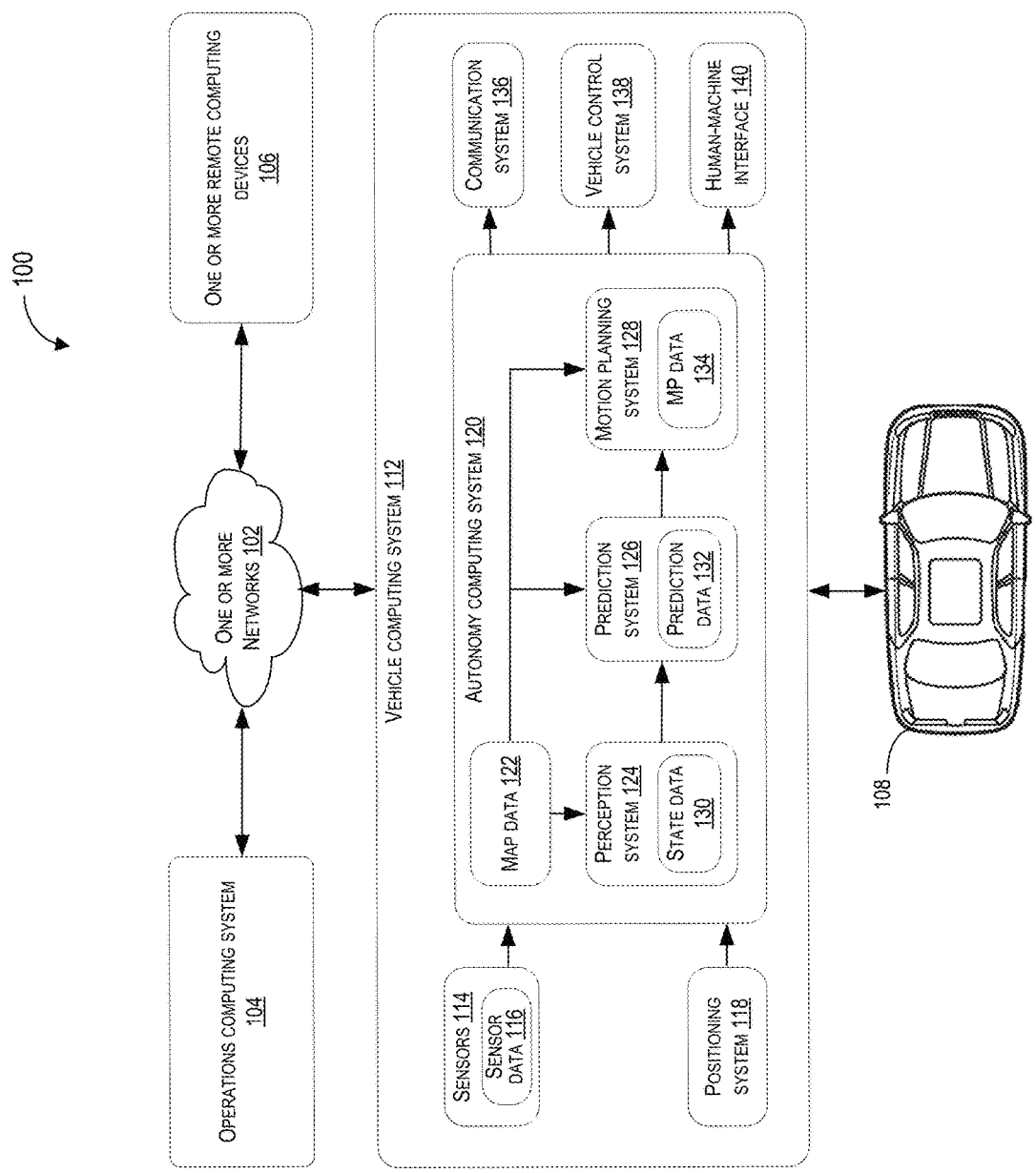
FIG. 1 depicts a diagram of an example system according to example embodiments of the present disclosure.

Example aspects of the present disclosure are directed to using a principled and data-driven framework to define and implement measurable safety requirements for controlling a vehicle (e.g., an autonomous vehicle). In particular, the disclosed technology can use information associated with the state of the vehicle and objects in the surrounding environment to determine risks of autonomous operations which can in turn be used as part of controlling the vehicle.

The disclosed technology can include the generation of motion plans that can be used in a variety of ways, including controlling an autonomous vehicle to operate in a manner in which the expected risk threshold is lower than that of human-driven vehicles and can adhere to a risk-level threshold that is defined prior to operation of the autonomous vehicle. For example, the disclosed technology can use the speed of the vehicle and the predicted paths of other actors in the environment to determine a speed profile (or velocity profile) for the vehicle that meets a set of predefined safety threshold criteria (e.g., a comparison against statistics for human-driven vehicles) while maintaining suitable vehicle operations. In this way, the disclosed technology can result in an autonomous vehicle control framework that balances the risk of potential accidents with the utility of autonomous vehicle operation. Further, the risk of potential interaction can be balanced relative to a high-level definition of acceptable risk.

The disclosed technology can be implemented as a computing system (e.g., a vehicle computing system) that is configured to access a variety of data including vehicle data and/or perception data. The vehicle data can include information associated with the state of a vehicle (e.g., the speed and/or velocity of the vehicle). Furthermore, the perception data can include location information and classification information respectively associated with the locations (e.g., geographical location) and classes (e.g., vehicle class) of objects that are around the vehicle. The vehicle computing system can then use the vehicle data and the perception data to determine a scenario exposure. The scenario exposure can include a probability of a potential interaction between the vehicle and the objects in the surrounding environment. For example, the scenario exposure can be used to indicate the risk of potential impediment, interference, contact, or other interaction between the vehicle and objects around the vehicle based on the relative location of the vehicle and the objects. Furthermore, the vehicle computing system can access prediction data (e.g., prediction data from a motion prediction system of the vehicle) that can include predicted trajectories of an object over a future time interval. Expected speed data can be determined based on a plurality of hypothetical speeds of the vehicle and a plurality of hypothetical distances between the vehicle and the object. Further, the expected speed data can include a plurality of expected speeds of the vehicle when the vehicle is a hypothetical distance from the predicted location of the object at some future time.

A combination of the scenario exposure, the prediction data, and the expected speed data can be used to generate a speed profile (or velocity profile) for the vehicle over a distance (e.g., the distance between the vehicle and the object). In some embodiments, the speed profile and/or the velocity profile can be associated with one or more trajectories of an object (e.g., an autonomous vehicle) in an environment. For example, the trajectory associated with the speed profile and/or velocity profile of a vehicle can include a set of speeds and positions along the path that the vehicle can traverse during some future time interval. The speed profile can include a set of vehicle speeds that satisfy a set of threshold criteria which can include a maximum speed at which the vehicle can travel to avoid contacting the object. Further, when contact with the object is unavoidable, the speed profile can minimize the severity of that contact. Unavoidable contact can arise, for example, in scenarios in which objects around the vehicle exhibit atypical, uncommon, unexpected, or erratic movement. Examples of unexpected actions can include another vehicle suddenly moving in front of the autonomous vehicle in the autonomous vehicle's lane (e.g., cutting-off the vehicle).

Through use of the prediction data (which can be generated by a motion prediction system associated with the vehicle), such actions may be foreseeable in the operating environment of the vehicle. The prediction data can be associated with a likelihood and/or probability of an action that an object in the environment can perform. The likelihood and/or probability of the object performing the action can then be used to determine a response (e.g., a response of an autonomous vehicle) to the action. In some embodiments, the probabilities of actions included in the prediction can be associated with respective confidence levels and the confidence levels can be used as part of determining the response (e.g., the response of a computing system associated with an autonomous vehicle). The speed profile (or velocity profile) can be used to generate a motion plan that can include information that is used to control the movement of the vehicle. For example, the motion plan can include a path and velocity of the vehicle over the future time interval.

Accordingly, the disclosed technology can improve the effectiveness of motion plans that are generated, particularly with the respect to a safe speed/velocity for the vehicle implementing the motion plan. This improvement in the effectiveness of the motion plan that is generated can allow for a large number of improvements in vehicle safety (and the safety of nearby objects) as well as the enhancing the overall operation of a vehicle and other systems that benefit from better motion plans.

The vehicle (e.g., ground-based vehicle, aircraft, and/or watercraft) in the present disclosure can be manually operated or an autonomous vehicle (e.g., a fully autonomous vehicle and/or a semi-autonomous vehicle) and can include various systems and devices configured to control the operation of the vehicle. For example, the vehicle can include a vehicle computing system (e.g., a computing system located on or within the autonomous vehicle) that is configured to operate the autonomous vehicle. The vehicle computing system can obtain sensor data from one or more sensors of the vehicle (e.g., cameras, LiDAR, and/or Radar) to determine the state of the vehicle's surrounding environment by performing various processing techniques on the sensor data and generate an appropriate motion plan associated with the vehicle's surrounding environment. As described herein, the vehicle computing system can generate motion plans that reduce the occurrence or severity of potential interactions between the vehicle and various objects within the vehicle's environment.

As part of performing the operations described herein, the vehicle computing system can access, receive, obtain, and/or retrieve data including vehicle data and/or perception data. The vehicle data can include information associated with the state of a vehicle (e.g., a speed, velocity, acceleration, orientation, and/or location of the vehicle) in an environment. Furthermore, the perception data can include location information associated with one or more locations of the vehicle and/or objects around the vehicle; and classification information associated with one or more object classes of one or more objects (e.g. an object (single object) or a plurality of objects) in the environment. The perception data can be based at least in part on one or more sensor outputs from one or more sensors (e.g., one or more cameras, Light Detection and Ranging (LiDAR) devices, sonar devices, and/or radar devices) of the vehicle that are configured to determine the state of the environment.

In some embodiments, the classification information (e.g., classification information including one or more object classes associated with the one or more objects) can be based at least in part on one or more outputs from one or more machine-learning models that are configured and/or trained to classify the one or more objects based at least in part on the perception data and/or the vehicle data. For example, the one or more machine-learning models can receive input (e.g., one or more images) including the perception data; perform one or more operations on the input (e.g., extract features of the one or more images included in the input); and generate an output including one or more classes associated with the input (e.g., classify objects in the image as vehicles, pedestrians, and/or cyclists). The one or more objects can include one or more vehicles (e.g., buses, trains, trolleys, trams, tractors, aircraft, boats, and/or automobiles), one or more pedestrians, one or more cyclists, and/or one or more other types of objects.

In some embodiments, the vehicle can include one or more portions. Each portion of the vehicle can be associated with a respective zone and each zone can represent a different severity of potential interaction between the vehicle and the one or more objects (e.g., the object in the environment). In some embodiments, the one or more portions of the vehicle can be part of a continuum of portions of the vehicle that can be divided into any number of discrete portions (e.g., two portions, one-hundred portions, or one-thousand portions). For example, the vehicle can include five zones including a forward zone (or front zone) at the front of the vehicle, a front left zone at the front left side of the vehicle (e.g., in front of and including the left side mirror), a front right zone at the front right side of the vehicle (e.g., in front of and including the right side mirror), a rear left side zone at the rear left side of the vehicle (e.g., behind the left side mirror), a rear right zone at the rear right side of the vehicle (e.g., behind the right side mirror), and/or a rear zone of the vehicle (e.g., at the rear bumper side of the vehicle).

In some embodiments, the zones of the vehicle can be based at least in part on the direction of travel of the vehicle (e.g., the rear bumper side of the vehicle can be the forward zone when the vehicle is travelling in reverse). The severity of potential interaction of the one or more portions of the autonomous vehicle that are closer to a direction of travel of the autonomous vehicle can be associated with a zone representing a severity of potential interaction that is greater than the severity of potential interaction of the one or more portions of the autonomous vehicle that are further away from the direction of travel of the autonomous vehicle. For example, when the vehicle is travelling in a forward direction of travel, the zone associated with the one or more portions of the vehicle at the front of the vehicle (e.g., the front bumper, front headlights, and hood of the vehicle) can represent a greater severity of potential interaction than the zone associated with the one or more portions of the vehicle at the rear of the vehicle (e.g., the rear (back) bumper, the tail-lights, and trunk of the vehicle), or the left and right sides of the vehicle (e.g., the sides of the vehicle that include doors for entry of passengers into the vehicle).

Furthermore, the one or more portions of the vehicle that are located at the front side of the vehicle can be associated with a zone representing a severity of potential interaction that is greater than the severity of potential interaction represented by the zone associated with the one or more portions of the vehicle located at one or more sides of the vehicle do not include the front side of the vehicle. For example, the one or more portions of the vehicle associated with the front side of the vehicle can be associated with the front side of the vehicle can be associated with a zone representing a greater severity of interaction than any other side of the vehicle including the rear (back) side of the vehicle, the left side of the vehicle, and/or the right side of the vehicle.

The vehicle computing system can determine and/or generate a scenario exposure. The scenario exposure can be determined and/or generated based at least in part on the vehicle data and/or the perception data. In some embodiments, the scenario exposure can be based at least in part on historical data associated with actions that were previously recorded by the vehicle computing system (e.g., log data based on vehicle sensor outputs); and/or aggregate models of object movement and/or behavior. In some embodiments, the scenario exposure may have been subject to analysis to focus on more specific aspects pertaining to object movement and/or behavior. The scenario exposure can include, be associated with, and/or represent a probability of a potential interaction between the vehicle and the one or more objects (e.g., the object in the environment). The scenario exposure can be associated with the risk, likelihood, and/or probability of one or more potential interactions and/or events that can occur between the vehicle, one or more passengers of the vehicle, and/or one or more objects external to the vehicle (e.g., one or more objects which can include one or more other vehicles, one or more pedestrians, and/or one or more cyclists). The potential interaction can include, for example, an autonomous vehicle impeding the path of an object, preventing motion of the object, or, if unavoidable, potential contact with the object (e.g., a vehicle suddenly cutting-off the autonomous vehicle), or vice versa.

Further, the scenario exposure can include information associated with the risk of one or more events including events associated with the vehicle and/or the one or more objects. In some embodiments, the scenario exposure can be determined based at least in part on use of one or more look-up tables each of which includes a variety of different parameters and values that can be compared to various values (e.g., vehicle speed, velocity, and/or the location of objects relative to the vehicle) in the vehicle data and/or perception data.

In some embodiments, determining the scenario exposure can include determining one or more spatial relationships and/or one or more temporal relationships between the vehicle and the one or more objects (e.g., the object in the environment). The one or more spatial relationships and/or the one or more temporal relationships can be based at least in part on the vehicle data and/or the perception data. By way of example, the one or more spatial relationships can include the position and orientation of the one or more objects relative to the vehicle and one another. Further, the one or more spatial relationships and/or the one or more temporal relationships can be associated with a plurality of scenario parameters and corresponding scenario values. For example, the plurality of scenario parameters can include a distance to an object and the corresponding scenario value (e.g., a distance of thirty meters).

Further, determining the scenario exposure can include determining the scenario exposure based at least in part on a similarity of the plurality of scenario parameters and corresponding scenario values to a respective plurality of preset scenario parameters and corresponding preset scenario values. For example, a set of scenario parameters (e.g., current vehicle velocity and/or distance to one or more objects of a particular class) and corresponding scenario values (e.g., velocity value, speed value, and/or distance value) of the vehicle can be compared to a set of preset scenario parameters (e.g., a set of scenario parameters that matches the scenario parameters and for which a corresponding set of preset parameter values have been determined in advance) and corresponding preset parameter values (e.g., a predetermined range of the scenario values to which the corresponding scenario values can be compared). The scenario exposure that is determined can be associated with the preset parameters and preset parameter values that are most similar and/or that match the plurality of scenario parameters and corresponding scenario values.

In some embodiments, the plurality of preset scenario parameters and corresponding preset scenario values can be based at least in part on a plurality of actual events involving a plurality of different spatial relationships and/or different temporal relationships and/or a plurality of different velocities between one or more vehicles, one or more pedestrians, one or more cyclists, and/or one or more other objects. For example, the plurality of preset parameters and corresponding present scenario values can be based on observations of interactions between vehicles, pedestrians, and/or cyclists. Further, the plurality of preset scenario parameters and corresponding preset scenario values can be based at least in part on statistics indicating the outcomes of various events.

Furthermore, the plurality of actual events can occur in a plurality of different environments comprising one or more different road surface types. For example, the one or more different road surface types can include paved road surfaces, unpaved road surfaces, dry road surfaces, and/or wet road surfaces.

In some embodiments, the plurality of preset scenario parameters and corresponding preset scenario values can be based at least in part on a plurality of different vehicle capabilities comprising one or more vehicle braking capabilities or one or more vehicle turning capabilities. The capabilities of the vehicle can be used as a factor in determining the scenario exposure. For example, the vehicle can have certain braking capabilities associated with various stopping distances of the vehicle at different vehicle velocities.

In some embodiments, determining the scenario exposure can include determining one or more distances between the vehicle and the one or more objects (e.g., the object in the environment). For example, the vehicle can include one or more sensors (e.g., LiDAR) that can be used to determine the distance between the vehicle and the one or more objects. Further, determining the scenario exposure can include comparing the one or more distances to a plurality of scenario parameters and corresponding scenario values including distance parameters and corresponding distance values. The scenario exposure can be based at least in part on a predetermined scenario exposure associated with the plurality of distance parameters and distance values that are within a predetermined range of similarity of the one or more distances.

The vehicle computing system can access the prediction data. Further, the prediction data can include one or more predicted trajectories of the one or more objects (e.g., the object in the environment) over a future time interval. The future time interval can include a time interval that is subsequent to a current time interval. For example, the vehicle computing system can include a prediction system that can use the class, location, speed, velocity, and/or acceleration of each of the one or more objects to determine the one or more predicted trajectories. In some embodiments, the one or more predicted trajectories can be based at least in part on the use of one or more machine-learning models that are configured and/or trained to determine predicted trajectories based at least in part on an input including the perception data.

In some embodiments, the prediction data can include one or more predicted trajectories of one or more hallucinated objects associated with one or more portions of the environment that are occluded and/or obfuscated. Further, the prediction data can be generated by one or more prediction systems (e.g., computing systems configured to predict the future state of detected objects) that are included as part of the vehicle computing system. For example, as part of generating the prediction data, the vehicle computing system can determine the one or more portions of the environment that are not detected by one or more sensors of the vehicle (e.g., the portions of the environment around the corner of a building). The vehicle computing system can then generate one or more hallucinated objects (e.g., computer generated objects that were not detected and can be included in the perception data as if the computer generated objects were actual objects that were detected by the vehicle's sensors) associated with the one or more portions of the environment that are occluded and/or obfuscated. By way of further example, the vehicle computing system can generate one or more hallucinated objects including a hallucinated bus that is around the corner of a building that occludes the vehicle's sensors.

Furthermore, the vehicle computing system can determine one or more predicted trajectories for the one or more hallucinated objects. For example, the vehicle computing system can generate one or more hallucinated objects including a hallucinated automobile that travels from out of a tunnel (e.g., a tunnel that the vehicle's sensors can detect only the first ten meters from the tunnels entrance) and across the travel path of the vehicle at a velocity of thirty-five kilometers per hour. In some embodiments, the one or more predicted trajectories can be based at least in part on one or more outputs of a motion prediction system of the vehicle. For example, the motion prediction system of the vehicle can receive one or more inputs including the perception data and/or sensor data, which can be used to determine the one or more predicted trajectories of the one or more objects.

The vehicle computing system can determine and/or generate data including expected speed data which can include and/or be associated with a plurality of speeds of the vehicle; and/or velocity data which can include and/or be associated with a plurality of expected velocities of the vehicle. The expected speed data or expected velocity data can be based at least in part on a plurality of hypothetical speeds or velocities of the vehicle and/or a plurality of hypothetical distances between the vehicle and the object. Each expected speed or expected velocity of the vehicle can represent and/or be associated with a respective speed or velocity of the vehicle when the vehicle is at least a hypothetical distance from a predicted location of the object at a future time (e.g., the predicted location of the object at a future time based at least in part on the prediction data).

By way of example, the vehicle computing system can use the current speed of the vehicle and distance of the vehicle from the object to determine a plurality of hypothetical speeds and hypothetical distances that are equal to or less than the current speed of the vehicle and current distance of the vehicle to the object. Further, the plurality of hypothetical speeds and hypothetical distances can be divided into respective speed intervals and distance intervals (e.g., hypothetical speeds of 30 km/h, 25, km/h . . . 5 km/h, and 0 km/h; and hypothetical distances of 30 m, 25 m . . . 5 m, and 0 m).

In some embodiments, determining and/or generating the expected speed data can include determining the expected speed data based at least in part on a plurality of hypothetical distances between the vehicle and at least one of the one or more hallucinated objects. Further, the plurality of hypothetical distances and/or the plurality of hypothetical speeds can be based at least in part on the distance of the vehicle from the one or more hallucinated objects in addition to the one or more objects. For example, a hallucinated object that is closer to the vehicle than an actual object (e.g., the object in the environment) can result in lower hypothetical speeds at each of the plurality of hypothetical distances from the object.

The vehicle computing system can determine a speed profile and/or velocity profile for the vehicle over a distance. The speed profile and/or velocity profile can be based at least in part on the scenario exposure, the prediction data, and/or the expected speed data. Further, the speed profile and/or velocity profile can satisfy a set of threshold criteria.

The speed profile or velocity profile can respectively include one or more speeds of the vehicle; or one or more velocities of the vehicle. Further, threshold criteria can include a threshold speed of the vehicle or threshold velocity of the vehicle. For example, the set of threshold criteria can include a threshold speed of the vehicle that can include a set of maximum speeds of the vehicle when the vehicle is a respective set of distances from the object in the environment. Based at least in part on the speed profile, the vehicle computing system can then determine that the speed of the vehicle will be below the threshold speed.

In some embodiments, the speed profile can include information associated with one or more maximum speeds or maximum velocities of the vehicle over a distance. For example, the speed profile can include a range of speeds at each of a plurality of distances from the object that allow the vehicle to avoid contact with the object.

In some embodiments, determining the speed profile or velocity profile can include determining when, whether, and/or that the vehicle cannot avoid contacting one or more objects (e.g., the object in the environment). For example, when an object moves at high speed, from an occluded location (e.g., a location that is not detected by the vehicle's sensors), into the path of the vehicle, the vehicle computing system can determine that the vehicle is travelling too quickly to stop the vehicle or avoid the vehicle contacting the object. Further, an object that suddenly/unexpectedly enters the vehicle's traveling lane can do so in a manner that makes contacting the object unavoidable.

Further, in response to determining that the vehicle cannot avoid contacting an object, determining the speed profile or the velocity profile can include determining a travel path, speed, and/or velocity of the vehicle that will minimize the severity of potential contact between the vehicle and the object. For example, when the vehicle cannot avoid contacting an object, the vehicle computing system can determine a travel path in which the vehicle contacts the object at the lowest possible velocity that can be achieved by the vehicle. By way of further, example, the vehicle computing system can minimize the severity of potential contact with an object by prioritizing glancing contacts by the vehicle over head-on contacts by the vehicle. For example, in the event that contact is unavoidable (e.g., due to another vehicle suddenly encroaching the vehicle's lane), the vehicle computing system can determine and/or generate severity data including the severity of potential interaction (e.g., physical contact between the vehicle and an object) associated with the vehicle contacting an object at different speeds and/or velocities.

In some embodiments, determining the speed profile or velocity profile can include, for each combination of a subset of combinations between (i) the plurality of expected speeds of the autonomous vehicle and (ii) the plurality of hypothetical distances between the autonomous vehicle and the object, determining a set of potential speeds of the autonomous vehicle upon traveling a respective hypothetical distance. For example, the vehicle computing system can estimate, based at least in part on the capabilities of the vehicle (e.g., motor performance capabilities), the set of potential speeds the vehicle can achieve at the plurality of hypothetical distances between the vehicle and the object. The plurality of hypothetical distances can, for example, be separated by regular intervals (e.g., intervals of five (5) meters) of the same distance or irregular intervals of variable distance. For example, the irregular intervals can be shorter (one (1) meter intervals) when the vehicle is within ten meters of the object and longer (five (5) meter intervals) when the vehicle is further than ten meters away from the object.

Further, determining the speed profile or velocity profile can include for each potential speed of the set of potential speeds, determining a set of probabilities of the respective potential speed causing a corresponding set of possible outcomes from the potential interaction between the autonomous vehicle and the object. For example, the vehicle computing system can access potential interaction data that includes a set of probabilities associated with sets of potential interactions between the vehicle and an object at various speeds or velocities. The potential interaction data can be based at least in part on data compiled from real-world or simulated interactions between different combinations of vehicle types, types of objects, approach angles, and/or road surfaces, at different speeds. By matching each potential speed to the speeds and outcomes in the potential interaction data, the potential interaction data can be used to determine the set of probabilities of the respective potential speed causing a corresponding set of possible outcomes form the potential interaction between the autonomous vehicle and the object.

Further, determining the speed profile or velocity profile can include determining the speed profile for the autonomous vehicle based at least in part on (i) the scenario exposure, (ii) the prediction data, (iii) the potential speeds, and (iv) the probabilities of the potential speeds causing possible outcomes from the potential interaction between the autonomous vehicle and the object. For example, the vehicle computing system can determine the speed profile or velocity profile based at least in part on the previously determined scenario exposure, prediction data, potential speeds (e.g., speeds within the capabilities of the vehicle), and the probabilities of the potential speeds causing possible outcomes (e.g., potentially contacting an object).

The severity of potential interaction can be associated with the severity of one or more interactions between the vehicle, one or more passengers of the vehicle, and/or one or more objects external to the vehicle.

In some embodiments, the severity of potential interaction can be based at least in part on a potential amount of contact between the vehicle and the one or more objects and/or a speed/velocity of the vehicle when the vehicle contacts one or more objects, if such contract is unavoidable. The severity of potential interaction can be indicative of a predicted amount of force of contact between the vehicle and an object, a predicted speed of the vehicle relative to an object, a predicted velocity of the vehicle relative to an object, a predicted acceleration of the vehicle at impact with an object, a change in momentum/speed/velocity/acceleration of the vehicle prior to contacting an object, an amount of surface area of vehicle and/or object making contact, a torque of the vehicle making contact with an object, and/or other parameters. A greater amount of contact between the vehicle and one or more objects (e.g., the object in the environment) can be positively correlated with the severity of potential interaction. By way of example, a greater speed/velocity of the vehicle or an oncoming object can be positively correlated with the severity of potential interaction.

In some embodiments, the severity of the potential interaction can be associated with a plurality of severity levels that can include a lowest severity level associated with little (to no) contact between the vehicle and the one or more objects (e.g., the vehicle making unnoticeable contact with the object or completely avoiding contact), a highest severity level associated with a most severe contact between the vehicle and the one or more objects (e.g., a swerving vehicle contracting the autonomous vehicle at a high speed/velocity), or one or more severity levels associated with contact between the vehicle and the one or more objects that is less severe than the most severe contact (e.g., the vehicle making a glancing contact with an object at low velocity).

In some embodiments, the speed profile or velocity profile be based at least in part on the different spatial relationships and/or object speeds/velocities relative to the vehicle. By way of example, the distance between the vehicle and an object and the velocity of the object relative to the vehicle can result in the generation of different speed/velocity profiles. Further, the speed/velocity profile can be based at least in part on the class of the object that can potentially interact with the vehicle. For example, there can be different speed/velocity profiles for vehicles and cyclists, or different speed/velocity profiles for different classes of vehicles (e.g., a speed/velocity profile for a compact vehicle and a different speed/velocity profile for a large truck). The speed/velocity profile can include a plurality of speeds/velocities and a corresponding plurality of severities of potential interaction. Further, the speed/velocity profile can include a range of speeds/velocities (e.g., speeds/velocities from zero kilometers per hour (0 km/h) to eighty kilometers per hour (80 km/h)) that are associated with a corresponding severity of potential interaction that can be across some range of values (e.g., in the range of one (0) to ten (10) with zero (0) representing no interaction between the vehicle and an object, 1 (1) representing the lowest severity of potential interaction, and ten (10) representing the highest severity of potential interaction).

By way of further example, the speed/velocity profile can include a speed/velocity of zero kilometers per hour (0 km/h) and a corresponding severity of potential interaction of zero (0) in which the vehicle is stationary and there is no interaction by the vehicle with the object (though an object can still interact with the vehicle); a speed/velocity of ten kilometers per hour (10 km/h) in which the vehicle is travelling slowly and the corresponding severity of potential interaction with an object is one (1) which indicates a low severity level of a potential interaction; and a speed/velocity of seventy kilometers per hour (70 km/h) in which the vehicle is travelling at high speed/velocity and the corresponding severity of potential interaction is ten (10) which indicates a high severity level of a potential interaction.

Further, determining the speed profile can include determining a maximum speed/velocity for the vehicle based at least in part on satisfaction of a set of threshold criteria comprising contact criteria associated with contact between the vehicle an object. For example, satisfying the contact criteria can include determining a maximum speed or velocity for the vehicle at which the vehicle does not contact any object.

In some embodiments, the speed profile and/or velocity profile can be based at least in part on a reaction (e.g., reaction time) and/or braking profile. Further, the reaction and braking profile can be associated with the braking capability of the vehicle. In some embodiments, the braking capability of the vehicle can include an amount of time between when the autonomous vehicle detects an object and when the vehicle brakes. The speed profile and/or velocity profile can include a mapping of an initial speed and/or velocity of the vehicle (e.g., the current velocity of the vehicle) to a known reaction time and braking profile. Further, the initial speed and/or velocity of the vehicle can be mapped to the vehicle's speed and/or velocity at some future time interval (across the temporal and spatial domains) based at least in part on the expected system latency (e.g., vehicle reaction time) associated with the vehicle and the braking authority available to an autonomy system of the vehicle.

Using the speed profile and/or velocity profile, the vehicle computing system (e.g., a motion planning system of the vehicle computing system) can sample over the velocities at one or more future time intervals based at least in part on predictions associated with one or more objects and/or one or more potentially unobserved objects (e.g., one or more hallucinated objects). The vehicle computing system can then determine a maximum speed or maximum velocity for the vehicle at which the vehicle can maintain the ability to either stop or sufficiently slow down to avoid potential contact with an object based at least in part on the scenario exposure.

The vehicle computing system can generate a motion plan and/or data including a motion plan. The motion plan can be based at least in part on the speed profile or the velocity profile. The motion plan can be used to control the movement of the vehicle and can include information associated with a trajectory, path, speed, velocity, and/or acceleration of the vehicle during the future time interval.

In some embodiments, the motion plan can include information associated with one or more paths for the vehicle to traverse during the future time interval. For example, the motion plan can include one or more paths that avoid contact with any of the one or more objects (e.g., avoid contact with the object in the environment). Further, the one or more paths of the vehicle can minimize the severity of potential interaction between the vehicle and one or more objects. For example, the lowest severity of potential interaction between the vehicle and one or more objects can include interactions in which the vehicle does not come into contact with any portion of the one or more objects. In the event that contact between the vehicle and an object is unavoidable (e.g., another vehicle enters the path of the vehicle before the vehicle is able to completely avoid the other vehicle), the motion plan can include a path that minimizes the severity of the potential interaction with the other vehicle (e.g., slow the vehicle down and swerve so that contact with the other vehicle is minimal).

A motion planning system associated with the vehicle can utilize the data described herein (e.g., scenario exposure, predicted object paths, speed/velocity profiles, and/or speed/velocity thresholds) as part of the determination, optimization, and/or selection of a motion plan for the vehicle. For example, the motion planning system can generate a plurality of candidate travel paths for the vehicle. In some implementations, as part of minimizing the one or more severities of potential interaction, the motion planning system can select a candidate travel path from among the plurality of candidate paths based at least in part on the scenario exposure, velocity thresholds, and/or other factors. Additionally, or alternatively, the motion planning system can optimize a selected candidate travel path to ensure that the vehicle will travel in a manner that minimizes the severity of any potential interaction (e.g., if unavoidable) given, for example, the scenario exposure.

The vehicle computing system can control one or more systems (e.g., vehicle systems) of an autonomous device (e.g., an autonomous vehicle). Control of the one or more vehicle systems can be based at least in part on the motion plan. The one or more vehicle systems can include one or more engine systems, one or more motor systems, one or more steering systems, one or more braking systems, one or more electrical systems, and/or one or more notification systems. For example, based at least in part on a motion plan that indicates a reduction in vehicle speed and/or velocity due to a nearby pedestrian, an autonomous vehicle can reduce the speed and/or velocity of the autonomous vehicle by controlling a braking system that applies brakes of the autonomous vehicle.

The disclosed technology can be implemented by a variety of systems that generate and implement motion plans. In particular, the disclosed technology can be used as part of a vehicle (e.g., an autonomous vehicle) that determines scenario exposure and generates more effective motion plans that control the speed and/or velocity of the vehicle in a way that avoids contact with objects, and when such contact is unavoidable (e.g., due to another vehicle suddenly veering into the lane), minimizes the severity of the contact. For example, an autonomous vehicle that maintains an appropriate velocity with respect to other vehicles can navigate the environment with a greater level of safety. Further, better determination of scenario exposure and generation of improved motion plans can result in a smoother ride and greater passenger comfort.

Furthermore, the disclosed technology can include a computing system that is configured to perform various operations including determining scenario exposure and generating motion plans. In some embodiments, the computing system can be associated with the autonomy system of an autonomous vehicle which can include a perception system, a prediction system, and/or a motion planning system. Furthermore, the computing system can process, generate, modify, and/or access (e.g., send, and/or receive) data and/or information including data and/or information associated with determining scenario exposure, generating a motion plan, and/or controlling the autonomy system of the autonomous vehicle. By way of example, in a bustling environment filled with a variety of objects (e.g., vehicles, pedestrians, and cyclists), the computing system can use various sensors (e.g., LiDAR, sonar, radar, and/or cameras) and vehicle systems (e.g., perception systems) of an autonomous vehicle to determine the location and class of the objects. The vehicle computing system can then generate control signals that are used to control various vehicle systems (e.g., motors, engines, and/or brakes) so that the vehicle can perform actions including changing the velocity of the vehicle as the vehicle traverses the environment.

The systems, methods, devices, and non-transitory computer-readable media in the disclosed technology can provide a variety of technical effects and benefits including improving the effectiveness of determining a scenario exposure and generating more effective motion plans. Further, the disclosed technology can improve the overall operation of devices (e.g., autonomous vehicles) that use the generated motion plans. Additionally, the disclosed technology can provide various benefits including an improvement in the utilization of computational resources, reduced wear and tear on a vehicle, greater fuel efficiency, and improved safety.

The disclosed technology can improve the efficiency of utilizing computational resources through determination of scenario exposure that is based in part on use of predetermined statistics and/or observations that can be compared to and/or associated with the current state of a vehicle. By, for example, using look-up tables, the disclosed technology is able to effectively determine scenario exposure in a rapid manner that is computationally inexpensive.

The disclosed technology can also improve the operation of a vehicle by reducing the amount of wear and tear on vehicle components through more gradual adjustments in the vehicle's travel path that can be performed based on improved motion plans that better regulate vehicle velocity as the vehicle approaches external objects. Further, improved motion planning can result in a safer and smoother ride with fewer sudden stops and sharp turns that impose excessive strain on a vehicle's engine, braking, and steering systems. Additionally, better motion planning has the added benefit of improving the comfort of passengers when the vehicle is in transit due to smoother adjustments by the vehicle that result from more effective motion plans resulting from use of information including scenario exposure.

The disclosed technology can further improve the operation of a vehicle by improving the energy efficiency of the vehicle. For example, improved motion planning can result in more efficient navigation of a vehicle through an environment by reducing the number of fuel consuming course changes a vehicle will make, thereby achieving a reduction in the overall amount of energy including the fuel and/or battery power consumed during operation of the vehicle.

Additionally, more effective motion planning can allow for an improvement in safety for passengers inside a vehicle as well as individuals outside the vehicle including pedestrians, cyclists, and/or passengers of other vehicles. For example, the improved motion planning achieved by the disclosed technology can be used by an autonomous vehicle's motion planning system to more effectively determine the class and/or location of objects and avoid contact with those objects. Furthermore, the disclosed technology can improve the operational safety of a vehicle for passengers of the vehicle by more effectively determining when to adjust the speed and/or velocity of the vehicle (e.g., reduce speed and/or velocity when pedestrians are nearby), and how to adjust the speed and/or velocity of the vehicle (e.g., slowly decelerating the vehicle when external objects are further away or quickly decelerating the vehicle when an object darts into the path of the vehicle). As such, passengers of the vehicle can enjoy the benefits of greater safety due to the improved scenario exposure determination and motion plan generation of the disclosed technology. Further, the disclosed technology can improve the operational safety of other vehicles and individuals inside and/or outside the vehicle by more effectively preventing contact between the vehicle and other objects.

Accordingly, the disclosed technology provides a host of improvements to the determination of scenario exposure, generation of motion plans, and the overall operation of associated devices (e.g., autonomous vehicles) in general. In particular, the improvements offered by the disclosed technology result in tangible benefits to a variety of systems including the mechanical, electronic, and computing systems of autonomous devices.

With reference now to FIGS. 1-19, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including operations associated with accessing vehicle and perception data; determining a scenario exposure based at least in part on the vehicle data including the speed of a vehicle in an environment and/or the perception data including location information and classification information associated with an object in the environment; accessing prediction data associated with one or more predicted trajectories for the object over a future time interval; determining expected speed data including a plurality of expected speeds of a vehicle; determining a speed profile for the vehicle; and generating a motion plan for controlling movement of the vehicle.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned models, that are described herein.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a position of an object relative to the vehicle 108 or other point of reference; a latitude of the object, a longitude of the object, and/or an altitude of an object detected by the one or more sensors 114 of the vehicle 108), the state of a vehicle (e.g., the velocity, acceleration, heading, bearing, position, and/or location of the vehicle 108), and/or the state of objects external to a vehicle (e.g., the physical dimensions, speed, velocity, acceleration, heading, shape, sound, and/or appearance of objects external to the vehicle). In some embodiments, the state data can include one or more portions of the sensor data that is described herein.

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the vehicle data, the perception data, the prediction data, the expected speed data, data associated with a scenario exposure, data expected with a speed profile or velocity profile, the sensor data, the training data, and/or the one or more machine-learned models that are stored in the operations computing system 104.

The one or more remote computing devices 106 can communicate (e.g., send and/or receive data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude, longitude, and/or altitude), a speed, a velocity, an acceleration, a trajectory, and/or a path of the vehicle 108 based in part on signals or data exchanged with the vehicle 108. In some implementations, the operations computing system 104 can include some of the one or more remote computing devices 106.

The vehicle 108 can be a ground-based vehicle (e.g., an automobile, a motorcycle, a train, a tram, a truck, a tracked vehicle, a light electric vehicle, a moped, a scooter, and/or an electric bicycle), an aircraft (e.g., a fixed-wing airplane, a helicopter, a vertical take-off and landing (VTOL) aircraft, a short take-off and landing (STOL) aircraft, and/or a tiltrotor aircraft), a boat, a submersible vehicle (e.g., a submarine), an amphibious vehicle, a hovercraft, a robotic device (e.g. a bipedal, wheeled, or quadrupedal robotic device), and/or any other type of vehicle. Further, the vehicle 108 can include a vehicle that can be towed, pushed, and/or carried by another vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manually operated mode (e.g., driven by a human driver), a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, speed, velocity, acceleration, heading, location, sound, color, and/or appearance of the environment which can include one or more objects) can be stored locally in one or more memory devices of the vehicle 108. Furthermore, the vehicle 108 can provide data indicative of the state of the one or more objects (e.g., physical dimensions, speed, velocity, acceleration, heading, location, sound, color, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including accessing vehicle and perception data; determining a scenario exposure based at least in part on the vehicle data including the speed of a vehicle in an environment and/or the perception data including location information and classification information associated with an object in the environment; accessing prediction data associated with one or more predicted trajectories for the object over a future time interval; determining expected speed data including a plurality of expected speeds of a vehicle; determining a speed profile for the vehicle; and generating a motion plan for controlling movement of the vehicle. Furthermore, the one or more memory devices of the vehicle computing system 112 can be used to store data including the vehicle data, the perception data, the prediction data, the expected speed data, data associated with a scenario exposure, data expected with a speed profile or velocity profile, the sensor data, the training data, and/or the one or more machine-learned models that are stored in the operations computing system 104.

Furthermore, the vehicle computing system 112 can perform one or more operations associated with the control, exchange of data, and/or operation of various devices and systems including vehicles, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more microphones (e.g., a microphone array including a plurality of microphones), one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sound data, sonar data, and/or other data acquired by the one or more sensors 114. The one or more objects detected by the one or more sensors 114 can include, for example, pedestrians, cyclists, vehicles, bicycles, buildings, roads, sidewalks, trees, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, the sensor data 116 can be indicative of one or more motion features and/or appearance features associated with one or more objects in an environment detected by the one or more sensors 114 including a LiDAR device and/or camera. By way of further example, the sensor data 116 can be indicative of a LiDAR point cloud and/or images (e.g., raster images) associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices);

and/or any other map data that provides information that assists the vehicle computing system 112 in processing, analyzing, and determining the state of its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to determine the state of the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan. One or more of the perception system 124, the prediction system 126, and/or the motion planning system 128 can be included in the same system and/or share at least some computational resources (e.g., processors, memory, and/or storage).

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class, vehicle class, or bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some embodiments, the prediction data 132 can include information associated with one or more predicted trajectories of an object over a future time interval.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat or front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 relative to one or more objects detected by the one or more sensors 114 including one or more radar devices. By way of further example, the autonomy computing system 120 can provide one or more outputs including a graphical display of the location of the vehicle 108 on a map of a geographical area within one kilometer of the vehicle 108, including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate and/or control one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
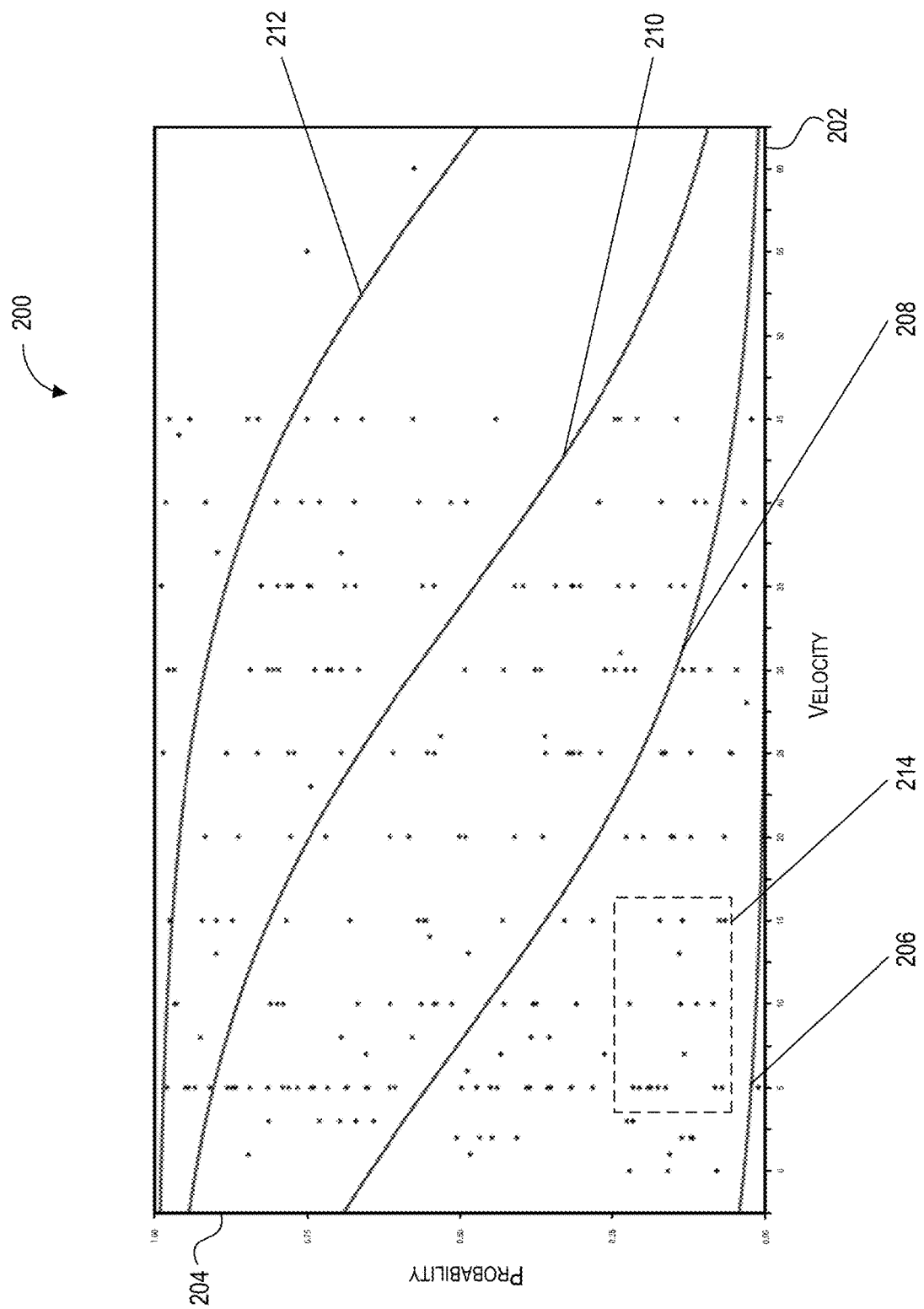
FIG. 2 depicts an example diagram of the probability of potential interactions between a vehicle and an object at different velocities according to example embodiments of the present disclosure.

FIG. 2 depicts an example diagram of the probability of potential interactions between a vehicle and an object at different velocities according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows an example of a diagram 200 including a velocity axis 202, a probability axis 204, a severity curve 206, a severity curve 208, a severity curve 210, and a severity curve 212.

The diagram 200 shows the probability at which interactions between a vehicle and an object occur at different velocities of the vehicle. Further, the diagram 200 includes the severity curves 206-212 that are correspond to severity levels (ranging from S0 to S4) and respective probabilities of interactions between the vehicle and the object occurring at different velocities.

The diagram 200 includes the velocity axis 202 (e.g., the x axis of the diagram 200) that is associated with a range of velocities of a vehicle travelling in some environment (e.g., the same vehicle travelling in the same environment at different velocities). In this example, the velocity axis 202 includes a range of velocities from a lowest velocity of zero (0) kilometers per hour at the far left edge of the velocity 202 to a greatest velocity of sixty-two (62) kilometers per hour at the far right edge of the velocity 202. The diagram 200 also includes the probability axis 204 (e.g., the y axis of the diagram 200) that is associated with a range of probabilities of potential interactions between the vehicle and some object in the environment. The probability axis 204 includes a range of probabilities from zero (0.0) in which there is no probability of an interaction occurring to one (1.0) in which there is a one-hundred percent probability of an interaction occurring.

Each of the points in the interactions 214 represents a subset of the interactions between the vehicle and an object at a velocity of between five (5) kilometers per hour and fifteen (15) kilometers per hour. The points (interactions) between the velocity axis 202 and the severity curve 206 represent the set of interactions between the vehicle and an object that are associated with a lowest level of severity (e.g., an S0 level in which there is no interaction between the vehicle and the object).

The points (interactions) between the severity curve 206 and the severity curve 208 represent the set of interactions between the vehicle and an object that are associated with an intermediate level of severity (e.g., an S1 level in which there is some interaction between the vehicle and the object and the interaction is at a low level of severity).

The points (interactions) between the severity curve 208 and the severity curve 210 represent the set of interactions between the vehicle and an object that are associated with an intermediate level of severity (e.g., an S2 level in which there is some interaction between the vehicle and the object and the level of the severity of interaction is greater than the S1 level).

The points (interactions) between the severity curve 210 and the severity curve 212 represent the set of interactions between the vehicle and an object that are associated with an intermediate level of severity (e.g., an S3 level in which there is some interaction between the vehicle and the object and the level of the severity of interaction is greater than the S2 level).

The points (interactions) between the severity curve 212 and the horizontal line perpendicular to the probability axis 204 represent the set of interactions between the vehicle and an object that are associated with the highest level of severity (e.g., an S4 level in which there is a very severe interaction between the vehicle and the object and the level of the severity of interaction is greater than the S3 level). Furthermore, in some embodiments, the speed of the vehicle can be used to determine the interactions instead of the velocity of the vehicle.

Figure 3:
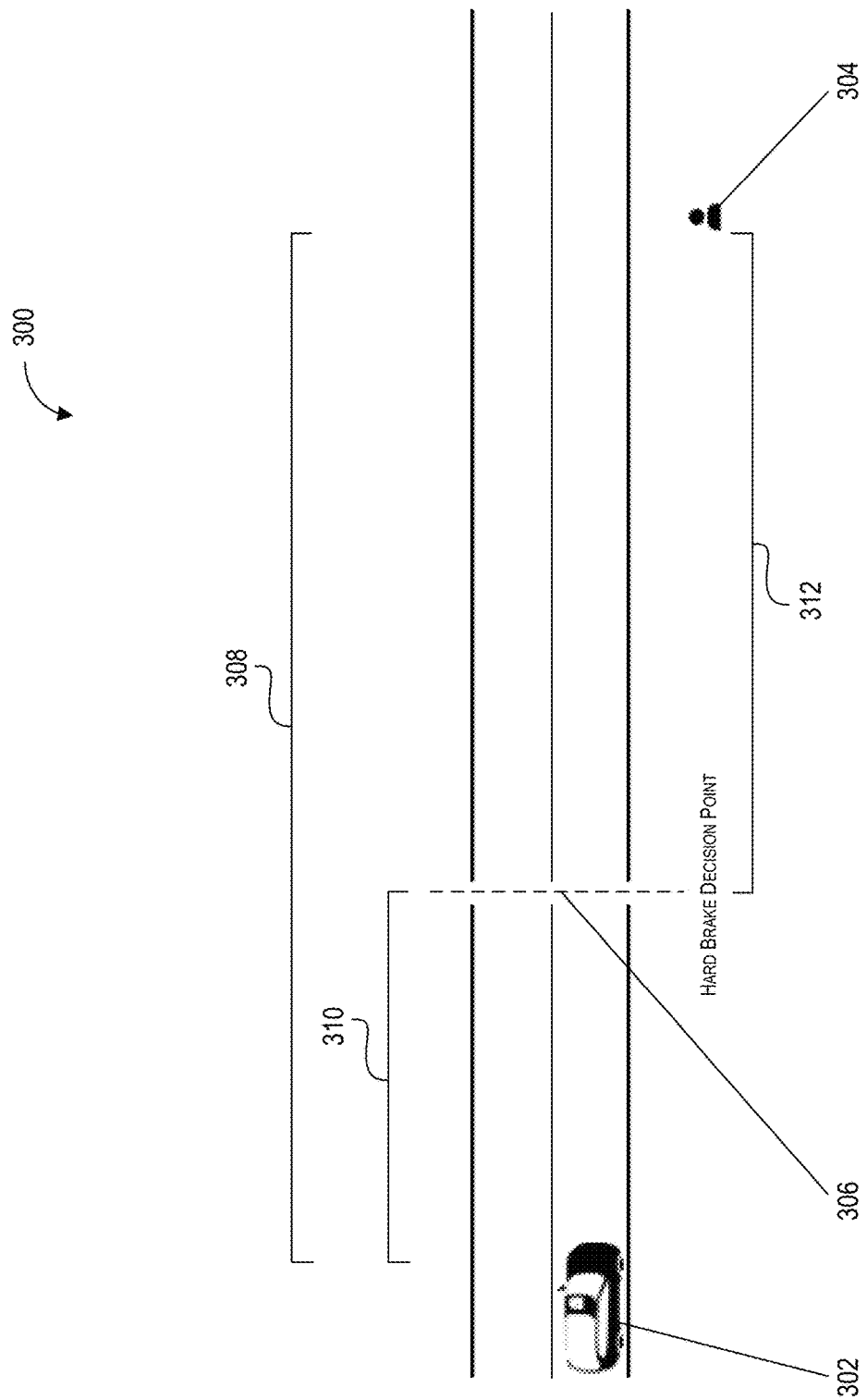
FIG. 3 depicts an example of a braking point between a vehicle and an observed object according to example embodiments of the present disclosure.

FIG. 3 depicts an example of a braking point between a vehicle and an observed object according to example embodiments of the present disclosure. One or more operations and/or functions in FIG. 3 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of an environment 300 including a vehicle 302, an object 304, a braking point 306, a distance 308, a distance 310, and a distance 312.

In this example, the vehicle 302 is approaching the object 304 which is the distance 308 (e.g., a distance of forty (40) meters) away from the vehicle 302. Further, the vehicle 302 is the distance 310 (e.g., a distance of fifteen (15) meters) from the braking point 306 which is the location at which the vehicle 302 can apply its brakes and stop before interaction with (e.g., intersecting or coming into contact with) the object 304, which is the distance 312 (e.g., a distance of twenty-five (25) meters) from the braking point 306. The location of the braking point 306 can be based at least in part on the velocity and/or speed of the vehicle 302 (e.g., the proximity of the braking point 306 to the object 304 is inversely correlated with the velocity of the vehicle 302); the braking capabilities of the vehicle 302 (e.g., the proximity of the braking point 306 to the object 304 is positively correlated with greater braking capabilities (shorter stopping distance at the same velocity) of the vehicle 302); the conditions of the road surface on which the vehicle 302 is driving (e.g., the distance 312 will be greater if the road surface is wet); the distance to the object 304 (e.g., the distance 312 will be greater if the object is closer to the vehicle 302); the trajectory and/or velocity/speed of the object 304 (e.g., the braking point 306 will be closer to the vehicle 302 is the object 304 is approaching or predicted to approach the vehicle 302).

FIG. 4 depicts an example of determining scenario exposure according to example embodiments of the present disclosure. One or more operations and/or functions in FIG. 4 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 4 can include one or more features of one or more devices and/or systems including, for example, the operations computing system 104, the vehicle 108, or the vehicle computing system 112, which are depicted in FIG. 1.

As illustrated, FIG. 4 shows an example of scenario exposure data 400 including a scenario parameter and value 402, a scenario parameter and value 404, a scenario parameter and value 406, a scenario parameter and value 408, a scenario parameter and value 410, and a scenario parameter and value 412.

In this example, the scenario parameters and values 402-412 are based at least in part on vehicle data and/or perception data that includes information associated with the state of a vehicle and the state of the environment that includes the vehicle and at least one object. The scenario parameters and values 402-412 can be used to determine a scenario exposure for a vehicle in an environment that includes at least one object.

The scenario parameter and value 402 includes a scenario parameter indicating the speed of a vehicle when the vehicle detects an object (e.g., a vehicle). The scenario parameter and value 402 is associated with a vehicle speed of twenty-five (25) kilometers per hour. The scenario parameter and value 404 includes a scenario parameter indicating the distance between the vehicle and the object when the vehicle detects the object, which in this case is a distance of forty (40) meters.

The scenario parameter and value 406 includes a scenario parameter indicating the speed of the vehicle at a decision horizon associated with a braking point plus ten (10) meters (e.g., ten (10) meters further away from the braking point and the object) at which the vehicle can stop before interacting with (e.g., intersecting or contacting) the object. The value associated with the scenario parameter and value 406 is twenty-five (25) kilometers per hour. The scenario parameter and value 408 includes a scenario parameter indicating the lateral speed of the object at a decision horizon associated with a braking point at which the vehicle can stop before intersecting or contacting the object. The value associated with the scenario parameter and value 408 is an object speed of zero (0) meters per second (e.g., the object is stationary).

The scenario parameter and value 410 includes a scenario parameter indicating the distance of the object to the road on which the vehicle is travelling when the vehicle is ten meters ahead of the decision horizon. The value associated with the scenario parameter and value 410 is four (4) meters. The scenario parameter and value 412 includes a scenario parameter indicating the heading of the object with respect the vehicle when the vehicle is ten meters ahead of the decision horizon. The value associated with the scenario parameter and value 412 is zero (0) degrees indicating that the object is on a heading that is directly in front of the approaching vehicle.

The scenario parameters and values 402-412 can, for example, be used by the vehicle computing system 112 (depicted in FIG. 1) to determine and/or generate a scenario exposure for the scenario including the vehicle and object in the particular environment including the vehicle and object.

Figure 5:
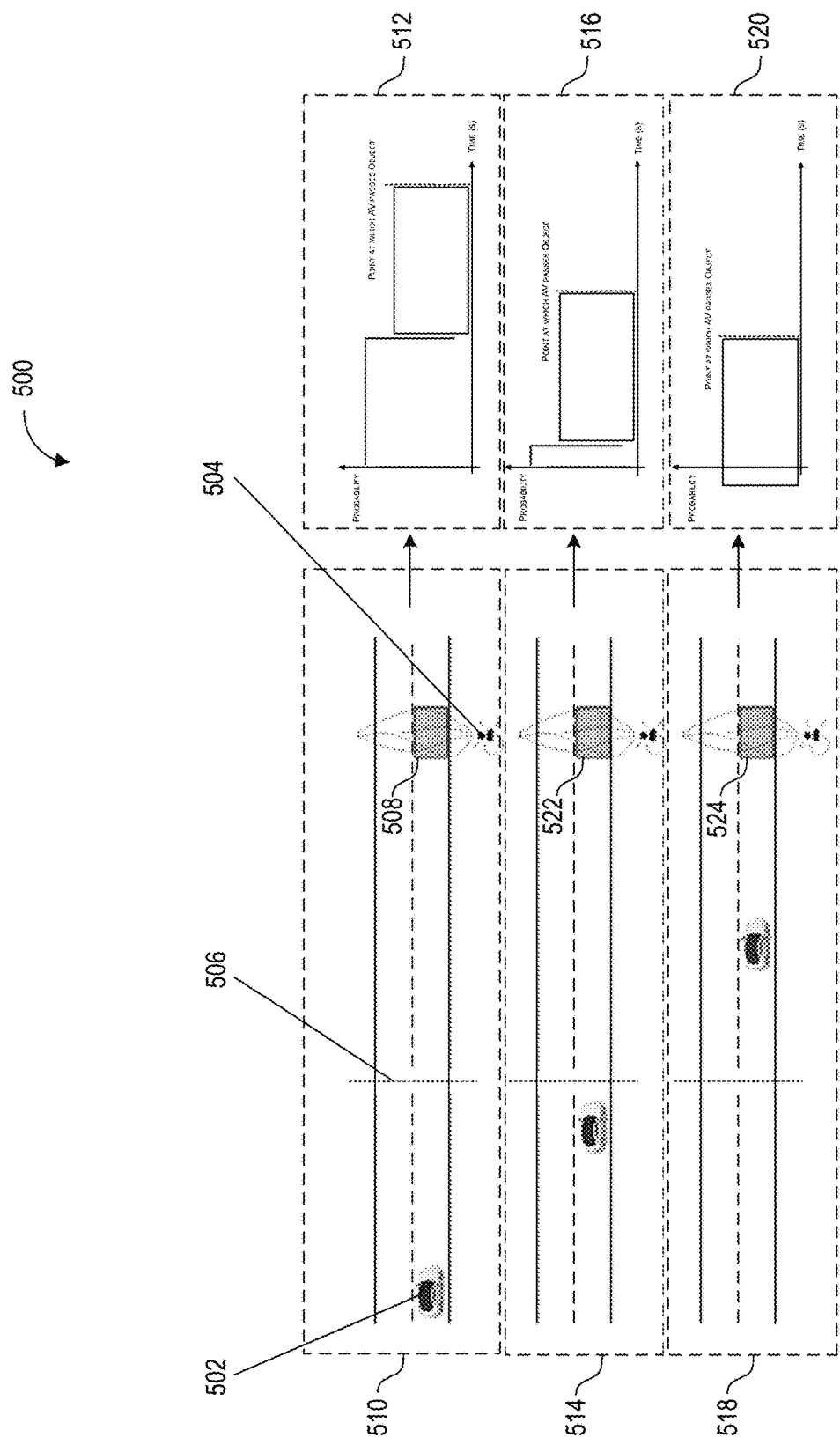
FIG. 5 depicts an example of predicting the trajectory of an object in an environment according to example embodiments of the present disclosure.

FIG. 5 depicts an example of predicting the trajectory of an object in an environment according to example embodiments of the present disclosure. One or more operations and/or functions in FIG. 5 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 5 can include one or more features of one or more devices and/or systems including, for example, the operations computing system 104, the vehicle 108, or the vehicle computing system 112, which are depicted in FIG. 1.

As illustrated, FIG. 5 shows an example of an environment 500, a vehicle 502, an object 504, a brake point 506, a predicted trajectory 508, a time interval 510, a probability 512, a time interval 514, a probability 516, a time interval 518, a probability 520, a predicted trajectory 522, and a predicted trajectory 524.

At the time interval 510 (e.g., an initial time interval) the vehicle 502 is fifteen (15) meters ahead of the brake point 506, which is thirty-five (35) meters ahead of the object 504. The brake point 506 is the location at which the vehicle 502 can brake before potentially interacting (e.g., intersecting or contacting) with the object 504. The predicted trajectory 508 is the predicted trajectory of the object 504 that is determined at the time interval 510 for the time interval subsequent to the time interval 510 (e.g., the time interval 514). The time interval 510 is associated with the probability 512, which represents the probability of an interaction between the vehicle and the object. At the time interval 510, the probability of an interaction between the vehicle 502 and the object 504 is low because the vehicle is behind the brake point 506, which offers the vehicle 502 ample distance to come to stop and avoid an interaction with the object 502. The vehicle 502, the object 504, and the brake point 506 are also shown in the time interval 514 and the time interval 518.

At the time interval 514 (e.g., a time interval subsequent to the time interval 510) the vehicle 502 has not yet reached the brake point 506 and is located one (1) meter ahead of the brake point 506, which remains thirty-five (35) meters ahead of the object 504. The predicted trajectory 522 is the predicted trajectory of the object 504 that is determined at the time interval 514 for the time interval subsequent to the time interval 514 (e.g., the time interval 518). At the time interval 514, the probability 516, which represents the probability of an interaction between the vehicle and the object, is at an intermediate level, since the vehicle 502 is now closer to the object 504 and has a shorter distance within which to stop in front of the object 504.

At the time interval 518 (e.g., a time interval subsequent to the time interval 514) the vehicle 502 is ten (10) meters past the brake point 506 and twenty-five (25) meters in front of the object 504. The predicted trajectory 524 is the predicted trajectory of the object 504 that is determined at the time interval 518 for a time interval subsequent to the time interval 514. At the time interval 518, the probability 520, which represents the probability of an interaction between the vehicle and the object, is high since the vehicle 502 has passed the brake point 506 and has less distance and time to come to a halt. At the time interval 518, the probability 520 is based at least in part on the predicted trajectory 508 of the object 504. For example, if the object 504 has a predicted trajectory 524 that crosses into the path of the vehicle 502, the probability 520 of an interaction between the vehicle 502 and the object 504 will be greater than if the predicted trajectory 524 has the object 504 remaining stationary and out of the path of the vehicle 502.

FIG. 6 depicts an example of outcome severity likelihood thresholds according to example embodiments of the present disclosure. One or more operations and/or functions in FIG. 6 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 6 can include one or more features of one or more devices and/or systems including, for example, the operations computing system 104, the vehicle 108, or the vehicle computing system 112, which are depicted in FIG. 1.

As illustrated, FIG. 6 shows an example of severity data 600 including total interactions 602, a standard deviation 604, incidents per kilometer 606, total kilometers 608, a threshold 610, a severity 612, a severity 614, and a severity 616.

The total interactions 602 can represent the total number of interactions between a vehicle and an object at the severity 612, the severity 614, and the severity 616. The severity 612 can represent the lowest level or degree of severity in which there is no interaction between the vehicle and the object; the severity 614 can represent an intermediate level or degree of severity in which there is some amount of interaction between the vehicle and the object; and the severity 616 can represent the highest degree of severity in which there is a high degree of interaction between the vehicle and the object. The total interactions 602 can be based at least in part on the observed and/or estimated interactions of one or more vehicles. For example, the total interactions 602 can be based on a sampling including the observation of thousands of interactions by millions of vehicles.

The standard deviation 604 can represent the standard deviation of the sampling distribution of the total number of interactions between the vehicle and the object at the severities 610/612/614. The interactions per kilometer 606 can represent the rate of interactions of the different severities 610/612/614, that a vehicle is estimated (or previously observed) to experience per kilometer travelled.

The total kilometers 608 can represent the total number of kilometers that a vehicle is expected (or previously observed) to travel between interactions at the severities 610/612/614. For example, the total number of kilometers that vehicles are expected to travel between occurrences of a severity 612 interaction between the vehicle and an object is 500,000,000 kilometers.

The threshold 610 can represent the threshold number of interactions per kilometer that a vehicle should remain below in order to have fewer interactions with an object than the estimated or previously observed interactions per kilometer at a respective level of severity. For example, for a vehicle to have fewer severity 614 interactions (intermediate level interactions) with an object, the vehicle would have to have fewer than the 0.00004 interactions per kilometer (approximately one interaction per four-hundred million ($4 \times 10^5$) kilometers).

Figure 7:
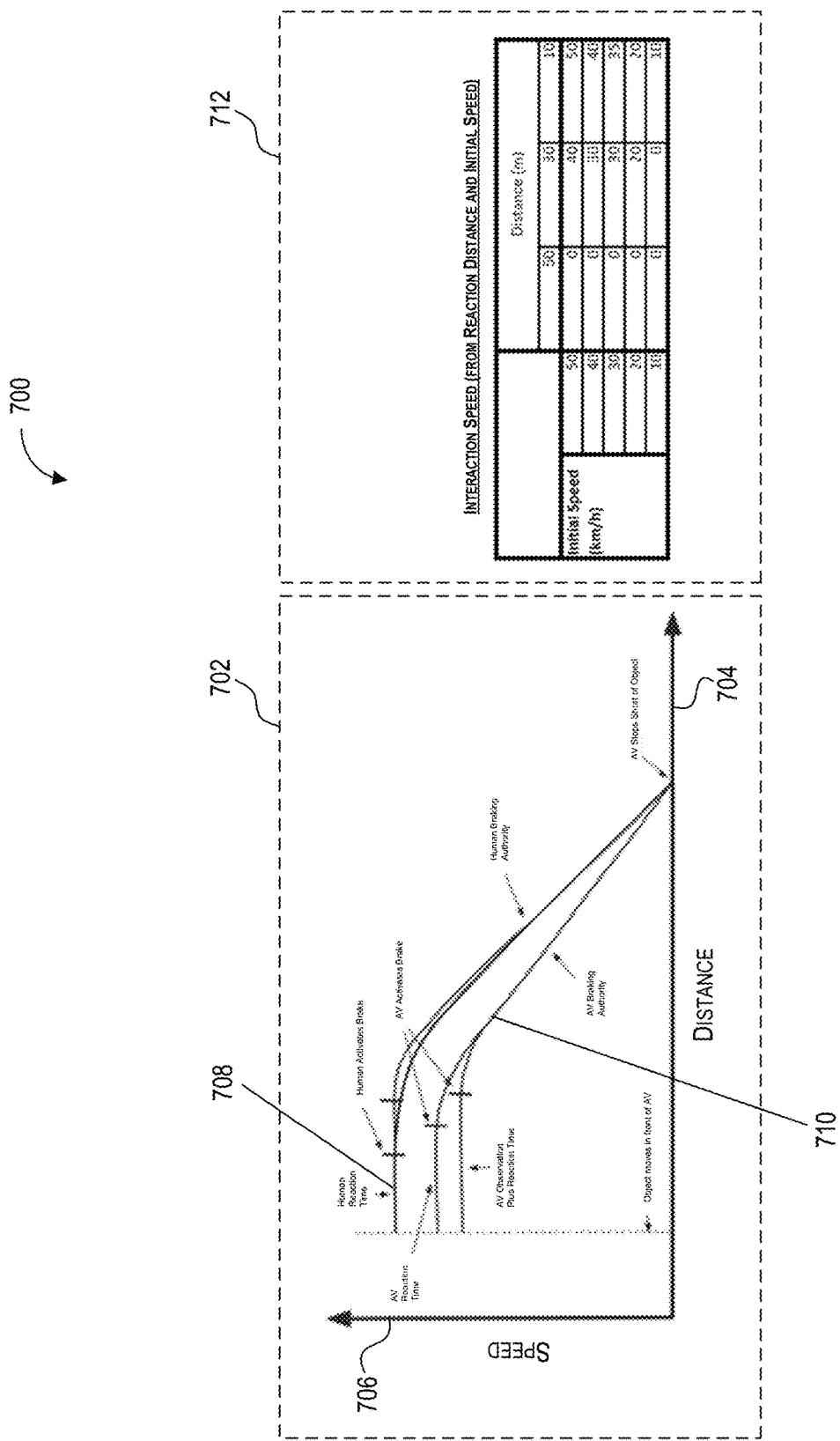
FIG. 7 depicts an example of maximum speed based on expected outcome severity according to example embodiments of the present disclosure.

FIG. 7 depicts an example of maximum speed based on expected outcome severity according to example embodiments of the present disclosure. One or more operations and/or functions in FIG. 7 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 7 can include one or more features of one or more devices and/or systems including, for example, the operations computing system 104, the vehicle 108, or the vehicle computing system 112, which are depicted in FIG. 1.

As illustrated, FIG. 7 shows an example of expected speed data 700 including reaction data 702, a distance axis 704, a speed axis 706, a braking profile 708, a braking profile 710, and interaction speed data 712.

The reaction data 702 is represented as a diagram that includes a distance axis 704 (the x axis) that indicates the distance (the distance is greater in the direction of the distance axis 704 arrow that points to the right) of a vehicle from an object and a speed axis 706 (the y axis) that indicates the speed (the speed of the vehicle is greater in the direction of the speed axis 706 arrow that points upwards) of the vehicle. As shown in FIG. 7, the braking profile 708 is associated with the performance of a human driver activating the brakes of a vehicle in response to detecting an object in the path of the vehicle that the human driver is driving. Further, the braking profile 710 is associated with the performance of an autonomous vehicle activating brakes of the autonomous vehicle in response to detecting an object in the path of the autonomous vehicle.

The interaction speed data 712 can be based at least in part on the reaction data 702 and can include an interaction speed between the vehicle and the object at various vehicle velocities and distances between the vehicle and the object. For example, at a distance of fifty (50) meters from the object, the vehicle is not expected to have an interaction with the object, hence the interaction speed of zero (0) kilometers per hour. The interaction speed can represent the speed of the vehicle when the vehicle interacts with an object. At a distance of thirty (30) meters from the object, the vehicle is expected to have an interaction speed that is positively correlated with the speed of the vehicle (e.g., the interaction speed is greater when the speed of the vehicle is greater). For example, at a distance of thirty (30) meters from the object and at an initial speed of thirty (30) kilometers per hour, the interaction speed is expected to be thirty (30) kilometers per hour. At a distance of ten (10) meters from the object, the vehicle is also expected to have an interaction speed that is positively correlated with the speed of the vehicle. For example, at a distance of ten (10) meters from the object and at an initial speed of thirty (30) kilometers per hour, the interaction speed is expected to be thirty (30) kilometers per hour. Furthermore, in some embodiments, expected velocity data can be generated based at least in part on the speed profile and can be based at least in part on set of velocities (e.g., a set of velocities including the speed and direction of the vehicle and/or one or more objects).

FIG. 8 depicts an example of diagrams showing a relationship between the severity and velocity of vehicle interactions with an object according to example embodiments of the present disclosure. One or more operations and/or functions in FIG. 8 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 8 can include one or more features of one or more devices and/or systems including, for example, the operations computing system 104, the vehicle 108, or the vehicle computing system 112, which are depicted in FIG. 1.

As illustrated, FIG. 8 shows an example of the data 800 including interaction velocity data 802 and severity level data 804.

The interaction velocity data 802 includes a range of speeds or velocities from ten (10) kilometers per hour to fifty (50) kilometers per hour. Furthermore, the range of speeds or velocities included in the velocity data 802 represent the velocity at which a vehicle interacts with (e.g., contacts) an object.

The severity level data 804 includes the likelihood of an interaction between the vehicle and the object at a given velocity associated with the interaction velocity data 802 and a respective severity of interaction. The severity of interaction can be associated with severity levels ranging from S0 (the lowest severity level) to S4 (the highest severity level).

As shown, at a vehicle speed or velocity of ten (10) kilometers per hour, the most likely severities of interaction include the intermediate severity level of S1, the intermediate severity level of S2, and the intermediate severity level of S3; with the least likely severity of interaction being the highest severity level of S4. At a vehicle speed or velocity of twenty (20) kilometers per hour, the most likely severity of interaction is the intermediate severity level of S3, with the least likely severity of interaction being the highest severity level of S4. At a vehicle speed or velocity of thirty (30) kilometers per hour, the most likely severity of interaction is the intermediate severity level of S2, with the least likely severity of interaction being the highest severity level of S4. At a vehicle speed or velocity of forty (40) kilometers per hour, the most likely severity of interaction is the intermediate severity level of S2, with the least likely severity of interaction being the highest severity level of S4. At a vehicle speed or velocity of fifty (50) kilometers per hour, the most likely severities of interaction include the intermediate severity level of S2 and the intermediate severity level of S3; with the least likely severity of interaction being the highest severity level of S4.

Figure 9:
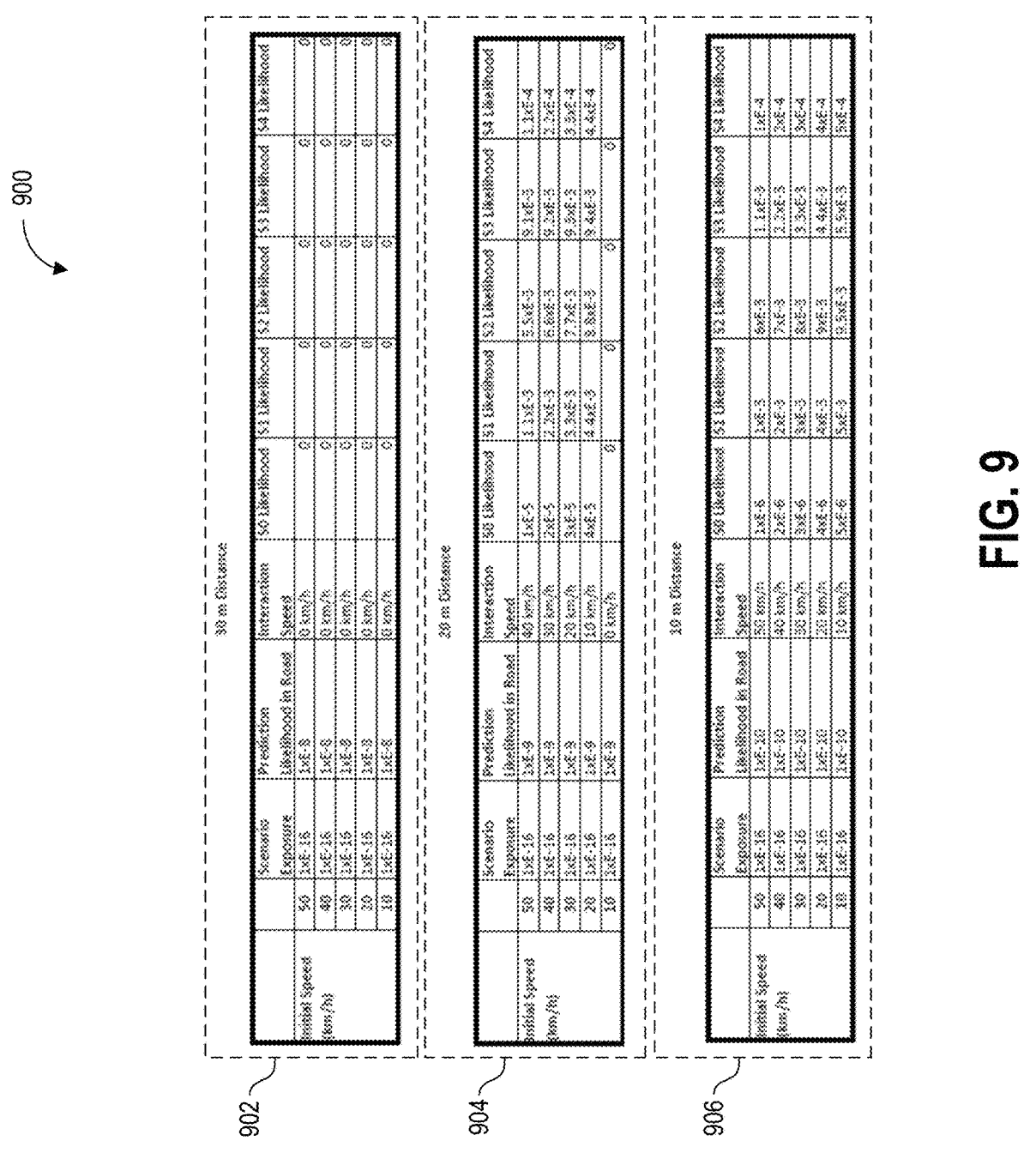

FIG. 9 depicts an example of expected speed data according to example embodiments of the present disclosure. One or more operations and/or functions in FIG. 9 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 9 can include one or more features of one or more devices and/or systems including, for example, the operations computing system 104, the vehicle 108, or the vehicle computing system 112, which are depicted in FIG. 1.

As illustrated, FIG. 9 shows an example of expected speed data 900 including expected speed data 902, expected speed data 904, and expected speed data 906.

The expected speed data 902 includes a plurality of hypothetical speeds of a vehicle at a distance of thirty (30) meters from an object. Each of the plurality of hypothetical speeds of the vehicle is associated with a respective scenario exposure, prediction likelihood of the object being in the path of the vehicle (e.g., the likelihood or probability that the object will be on the road that the vehicle will traverse and/or cross the travel path of the vehicle), an interaction speed (e.g., a speed at which the vehicle will potentially contact the object), and the respective likelihood of an interaction between the vehicle and the object being at a respective severity level ranging from S0 (the lowest severity level) to S4 (the highest severity level). In this example, at a distance of thirty (30) meters from the object, the expected speed data 902 indicates that the vehicle will be able to avoid any interaction with the object.

The expected speed data 904 includes a plurality of hypothetical speeds of a vehicle at a distance of twenty (20) meters from the object. Each of the plurality of hypothetical speeds of the vehicle is associated with a respective scenario exposure, prediction likelihood that the object will be in the path of the vehicle (e.g., the likelihood or probability that object is on the road that the vehicle will traverse), an interaction speed (e.g., a speed at which the vehicle will potentially contact the object), and the respective likelihood of an interaction between the vehicle and the object being at a respective severity level ranging from S0 (the lowest severity level) to S4 (the highest severity level). In this example, at a distance of thirty (30) meters from the object, the expected speed data 904 indicates that the vehicle will be able to avoid any interaction with the object at a speed of ten (10) kilometers per hour or lower but that there is a small likelihood of the vehicle interacting with the object at a speed of twenty (20) kilometers per hour or greater. Further, the likelihood of the vehicle interacting with the object increases as the speed of the vehicle increases. Additionally, the likelihood of a more severe interaction is positively correlated with the interaction speed such that the severity of an interaction is greater at a greater speed of the vehicle interacting with the object.

The expected speed data 906 includes a plurality of hypothetical speeds of a vehicle at a distance of ten (10) meters from the object. Each of the plurality of hypothetical speeds of the vehicle is associated with a respective scenario exposure, prediction likelihood that the object will be in the path of the vehicle (e.g., the likelihood or probability that object is on the road that the vehicle will traverse), an interaction speed (e.g., a speed at which the vehicle will potentially contact the object), and the respective likelihood of an interaction between the vehicle and the object being at a respective severity level ranging from S0 (the lowest severity level) to S4 (the highest severity level). In this example, at a distance of ten (10) meters from the object, the expected speed data 906 indicates that the vehicle has some likelihood of an interaction at any speed. Further, the likelihood of the vehicle interacting with the object decreases as the speed of the vehicle increases. For example, the vehicle may increase speed to quickly swerve out of the way of an object. Additionally, the likelihood of a more severe interaction is positively correlated with the interaction speed. Furthermore, in some embodiments, expected velocity data can be generated based at least in part on the speed profile and can be based at least in part on set of velocities (e.g., a set of velocities including the speed and direction of the vehicle and/or one or more objects).

Figure 10:
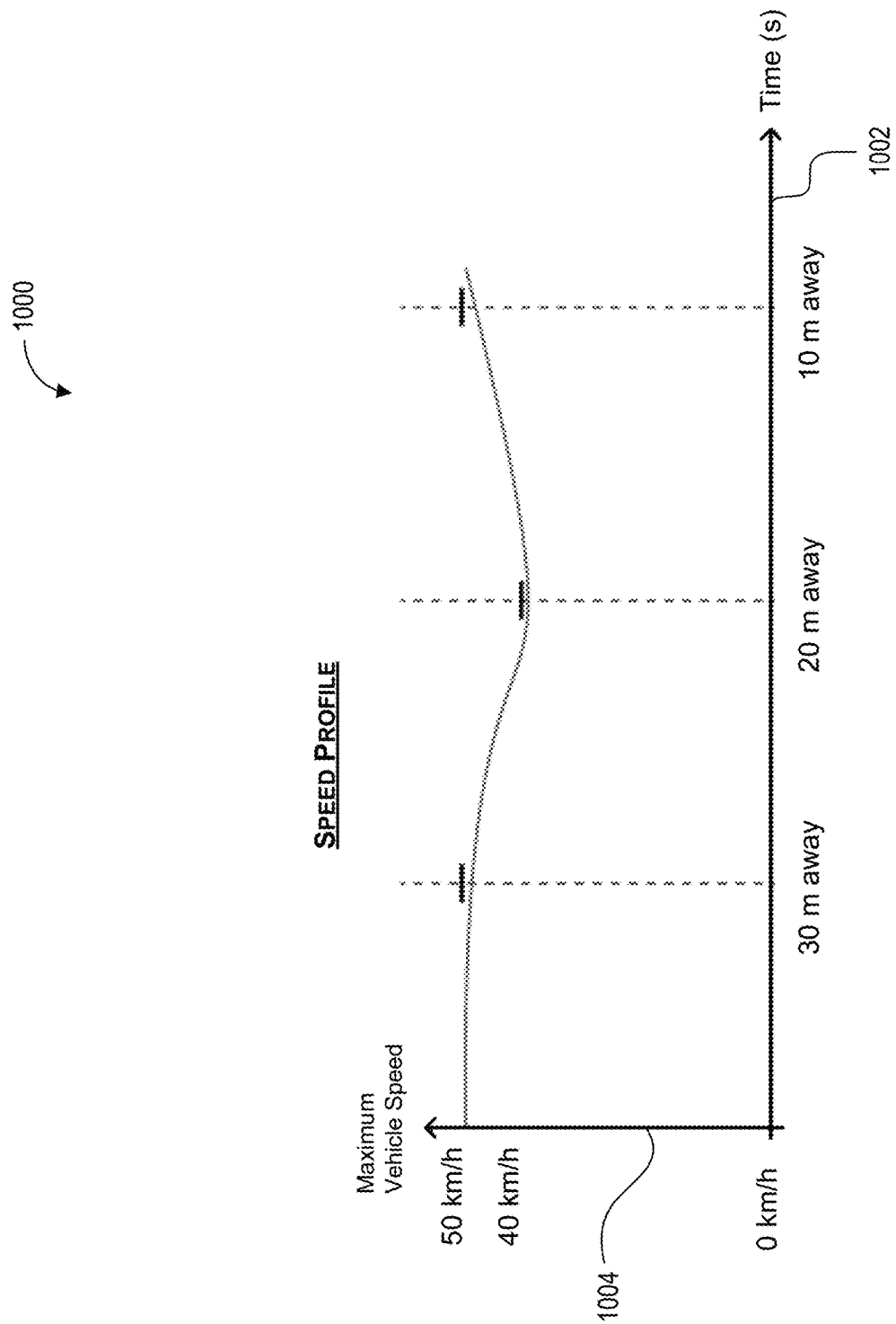
FIG. 10 depicts an example of a speed profile according to example embodiments of the present disclosure.

FIG. 10 depicts an example of a speed profile according to example embodiments of the present disclosure. One or more operations and/or functions in FIG. 10 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 10 can include one or more features of one or more devices and/or systems including, for example, the operations computing system 104, the vehicle 108, or the vehicle computing system 112, which are depicted in FIG. 1.

As illustrated, FIG. 10 shows an example of speed profile 1000 (e.g., a speed profile of a vehicle at a plurality of vehicle speeds and distances from an object) including a distance away from object axis 1002 and a speed axis 1004.

In this example, the speed profile is associated with a maximum speed at which a vehicle can travel while keeping the probability that the vehicle will potentially interact with an object below a threshold level. As shown, when the vehicle is thirty (30) meters away from the object, the speed profile indicates that the vehicle can travel at a speed of fifty (50) kilometers per hour; when the vehicle is twenty (20) meters away from the object, the speed profile indicates that the vehicle can travel at a speed of forty (40) kilometers per hour; and when the vehicle is ten (10) meters away from the object, the speed profile indicates that the vehicle can travel at a speed of fifty (50) kilometers per hour. In some embodiments, the speed profile can be used as part of generating and/or determining a motion plan for a vehicle. Furthermore, in some embodiments, a velocity profile can be generated based at least in part on the speed profile and can be based at least in part on a set of velocities (e.g., the speed and direction of the vehicle and/or one or more objects).

FIG. 11 depicts an example of the frequency of the occurrence of potential interactions at different severity levels according to example embodiments of the present disclosure. One or more operations and/or functions in FIG. 11 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 11 can include one or more features of one or more devices and/or systems including, for example, the operations computing system 104, the vehicle 108, or the vehicle computing system 112, which are depicted in FIG. 1.

As illustrated, FIG. 11 shows an example of data 1100 (e.g., data associated with the frequency of the occurrence of events of varying severity) including a severity level 1102, a severity level 1104, a severity level 1106, a severity level 1108, and a severity level 1110.

In this example, each of the severity levels 1102/1104/1106/1108/1110 is associated with a respective frequency of occurrence of an interaction between a vehicle and an object per kilometer. The frequency of occurrence of an interaction per kilometer indicates the frequency with which an interaction (e.g., an interaction between a vehicle and an object on the road) at a corresponding severity level is determined to occur per kilometer of driving a vehicle. The frequency with which an interaction occurs can be based at least in part on any combination of observation of the frequency of real-world events (e.g., real-world events that can be compiled in the form statistical form); simulation of events using a simulator; and/or an estimate of the frequency of events based on testing in a training environment.

In this example, the severity level 1102 (S0) can be associated with an interaction of the lowest severity in which there is a low level of interaction or minimal interaction between the vehicle and an object. As shown, severity level 1102 interactions can occur at a rate of five times per million (1,000,000) kilometers driven. The severity level 1104 (S1), the severity level 1106 (S2), and the severity level 1108 (S3) can be associated with an interaction at an intermediate level of severity in which there is some potentially significant interaction between the vehicle and an object. As shown, severity level severity level 1104, the severity level 1106, and the severity level 1108 interactions can occur at a rate of four times per hundred-thousand (100,000) kilometers driven. The severity level 1110 (S4) can be associated with an interaction of the highest severity in which there is a high level of interaction between the vehicle and an object. As shown, severity level 1110 interactions can occur at a rate of three times per ten-thousand (10,000) kilometers driven.

Figure 12:
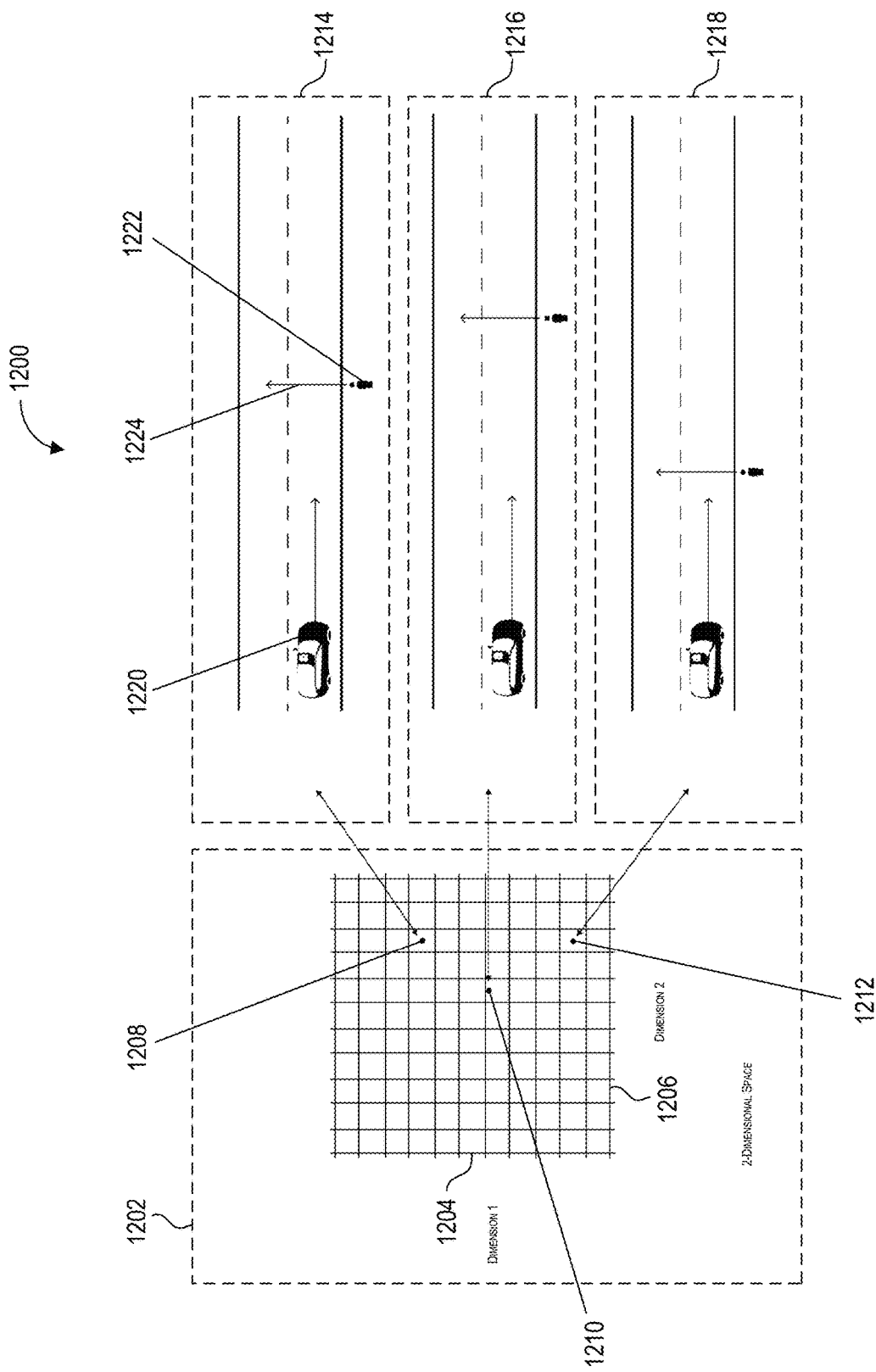
FIG. 12 depicts an example of determining the probability of future actions of an object in an environment according to example embodiments of the present disclosure.

FIG. 12 depicts an example of predicting the trajectory of an object in an environment according to example embodiments of the present disclosure. One or more operations and/or functions in FIG. 12 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 12 can include one or more features of one or more devices and/or systems including, for example, the operations computing system 104, the vehicle 108, or the vehicle computing system 112, which are depicted in FIG. 1.

As illustrated, FIG. 12 shows an example of a representation 1200 including a two-dimensional space 1202, a dimension 1204, a dimension 1206, a point 1208, a point 1210, a point 1212, a scenario 1214, a scenario 1216, a scenario 1218, an object 1220, an object 1222, and a predicted trajectory 1224.

In this example, the two-dimensional space 1202 is used as part of the determination of the probability of predicted future actions of one or more objects in an environment. The potential future actions of the one or more objects in the environment can be represented by the two-dimensional space 1202 which includes the dimension 1204 and the dimension 1206 which can correspond to and/or be associated with different scenario modifiers. For example, the dimension 1204 can be associated with the distance between a vehicle and an object and the dimension 1206 can be associated with the speed of the vehicle. The points 1208/1210/1212 can represent points on the two-dimensional space 1202 and can be associated with respective values of the dimension 1204 and the dimension 1206. For example, the point 1208 can be associated with a distance of twenty (20) meters between the object 1220 (e.g., a vehicle) and the object 1222; and a thirty (30) kilometer per hour speed of the object 1220. The point 1208 can be associated with the actual state of one or more objects in an environment and can be used to determine various trajectories of the one or more objects in real-time as, for example, a vehicle traverses the environment. Further, the point 1208 can be used as part of determining the scenario 1214, which is associated with a potential interaction between objects (e.g., a vehicle and another object) in the environment. The scenario 1214 can be used to determine a speed profile, velocity profile, and/or trajectory for one or more objects in the environment. Further, the scenario 1214 can be used to predict the motion of the one or more objects over time.

By way of further example, the point 1210 and the point 1212 can be associated with the scenario 1216 and the scenario 1218 respectively. Further, the scenario 1216 and the scenario 1218 can describe scenarios that are different from the scenario 1214, though some aspects of the scenario 1216 and the scenario 1218 can be similar or the same as that of the scenario 1214. For example, the speed of the vehicle in the scenario 1218 can be the same as the speed of the vehicle in the scenario 1214.

The representation 1200 depicted in FIG. 12 is one embodiments of a representation of potential future actions of one or more objects in an environment. Further, the representation can include any number of dimensions. In some embodiments, the number of dimensions can be positively correlated with scenario complexity. Further, the same number of dimensions of a representation can be used to represent different complexities of scenario based at least in part on the scenario modifiers associated with the respective dimensions. In some embodiments, dimensionality reduction can be positively correlated with the number of errors. The error associated with dimensionality reduction can be used when determining the validity and/or accuracy of the determined speed profile, velocity profile, trajectory, or predicted motion of an object.

Figure 13:
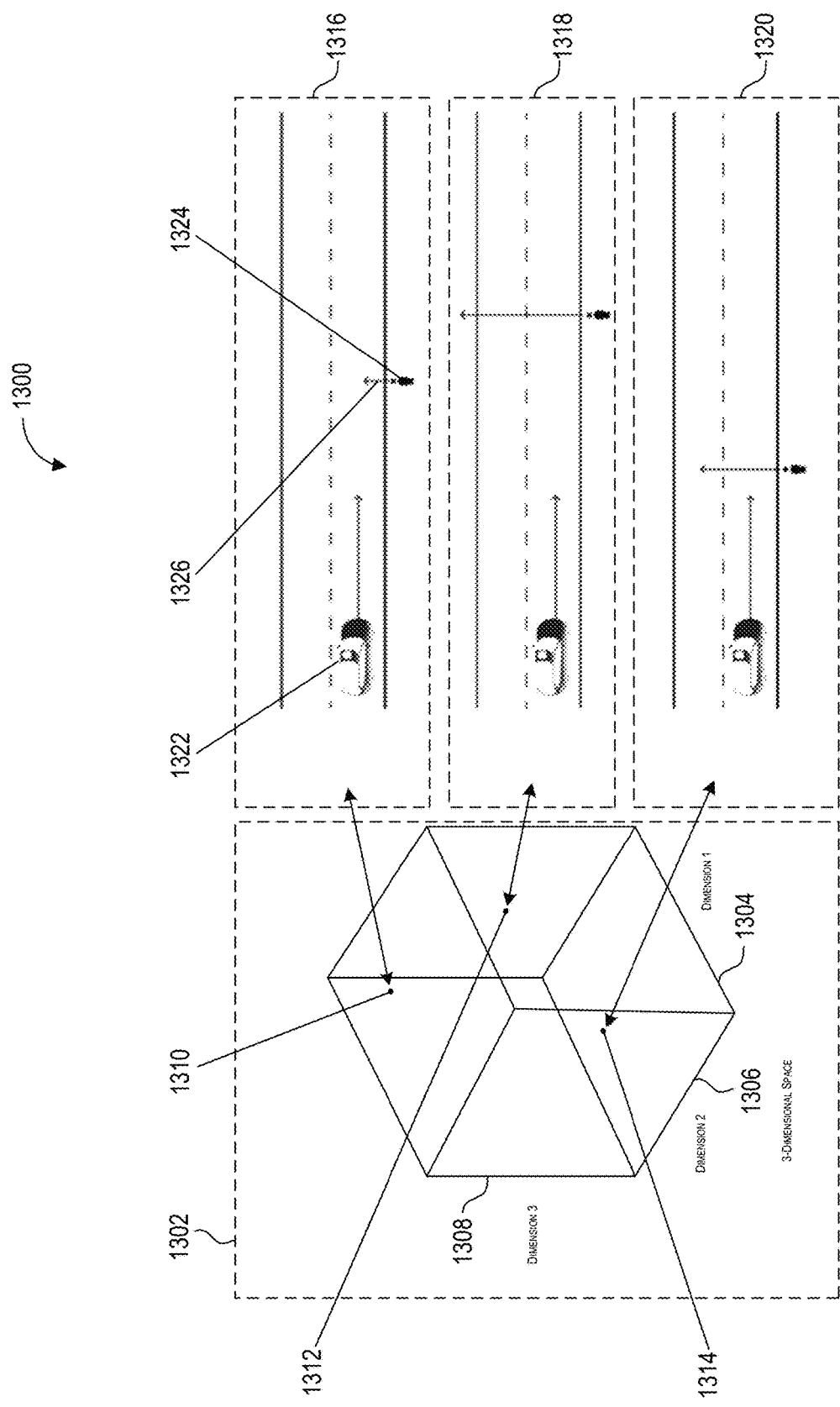
FIG. 13 depicts an example of determining the probability of future actions of an object in an environment according to example embodiments of the present disclosure.

FIG. 13 depicts an example of predicting the trajectory of an object in an environment according to example embodiments of the present disclosure. One or more operations and/or functions in FIG. 13 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 13 can include one or more features of one or more devices and/or systems including, for example, the operations computing system 104, the vehicle 108, or the vehicle computing system 112, which are depicted in FIG. 1.

As illustrated, FIG. 13 shows an example of a representation 1300 including a three-dimensional space 1302, a dimension 1304, a dimension 1306, a dimension 1308, a point 1310, a point 1312, a point 1314, a scenario 1316, a scenario 1318, a scenario 1320, an object 1322, an object 1324, and a predicted trajectory 1326.

In this example, the three-dimensional space 1302 is used as part of the determination of the probability of predicted future actions of one or more objects in an environment. The potential future actions of the one or more objects in the environment can be represented by the two-dimensional space 1302 which includes the dimension 1304, the dimension 1306, and the dimension 1308 which can correspond to and/or be associated with different scenario modifiers. For example, the dimension 1304 can be associated with a minimum braking distance for a vehicle, the dimension 1306 can be associated with the distance to between a vehicle and an object, and the dimension 1308 can be associated with the velocity of the object 1322 (e.g., a vehicle). The points 1310/1312/1314 can represent points on the three-dimensional space 1302 and can be associated with respective values of the dimension 1304, the dimension 1306, and the dimension 1308. For example, the point 1314 can be associated with a minimum braking distance of fifteen (15) meters of the object 1322; a distance of twenty-five (25) meters between the object 1322 and the object 1324; and an object 1322 velocity of forty (40) kilometer per hour. Further, the point 1314 can be associated with the actual state of the object 1322 (e.g., a vehicle) in an environment and can be used to determine various trajectories of one or more objects in real-time as the vehicle (e.g., the object 1322) traverses the environment. In this example, the point 1314 can be used as part of determining the scenario 1320, which is associated with a potential interaction between the object 1322 and the object 1324 in the environment. The scenario 1320 can be used to determine a speed profile, a velocity profile, and/or a trajectory for the object 1324. For example, the scenario 1320 can be used to determine the predicted trajectory 1326 of the object 1324.

By way of further example, the point 1310 and the point 1312 can be associated with the scenario 1316 and the scenario 1318 respectively. Further, the scenario 1316 and the scenario 1318 can describe scenarios that are different from the scenario 1314, though some aspects of the scenario 1316 and the scenario 1318 can be similar or the same as that of the scenario 1314. For example, the velocity of the vehicle 1322 in the scenario 1318 can be the same as the velocity of the object in the scenario 1314; and the distance between the object 1322 and the object 1324 can be different.

The representation 1300 depicted in FIG. 13 is one embodiments (the representation 1200 depicted in FIG. 12 is another embodiment) of a representation of potential future actions of one or more objects in an environment. In this example, the future actions include a predicted trajectory of an object detected by one or more sensors of another object (e.g., a vehicle). Further, as depicted, the representation 1300 includes a depiction of a three-dimensional space 1302. In other depictions the representation can include any number of dimensions which can be positively correlated with scenario complexity. Further, the same number of dimensions included in the representation can be used to represent different complexities of scenario based at least in part on the scenario modifiers associated with the respective dimensions. In some embodiments, dimensionality reduction can be positively correlated with the number of errors. The error associated with dimensionality reduction can be used when determining the validity and/or accuracy of the determined speed profile, velocity profile, trajectory, or predicted motion of an object.

Figure 14:
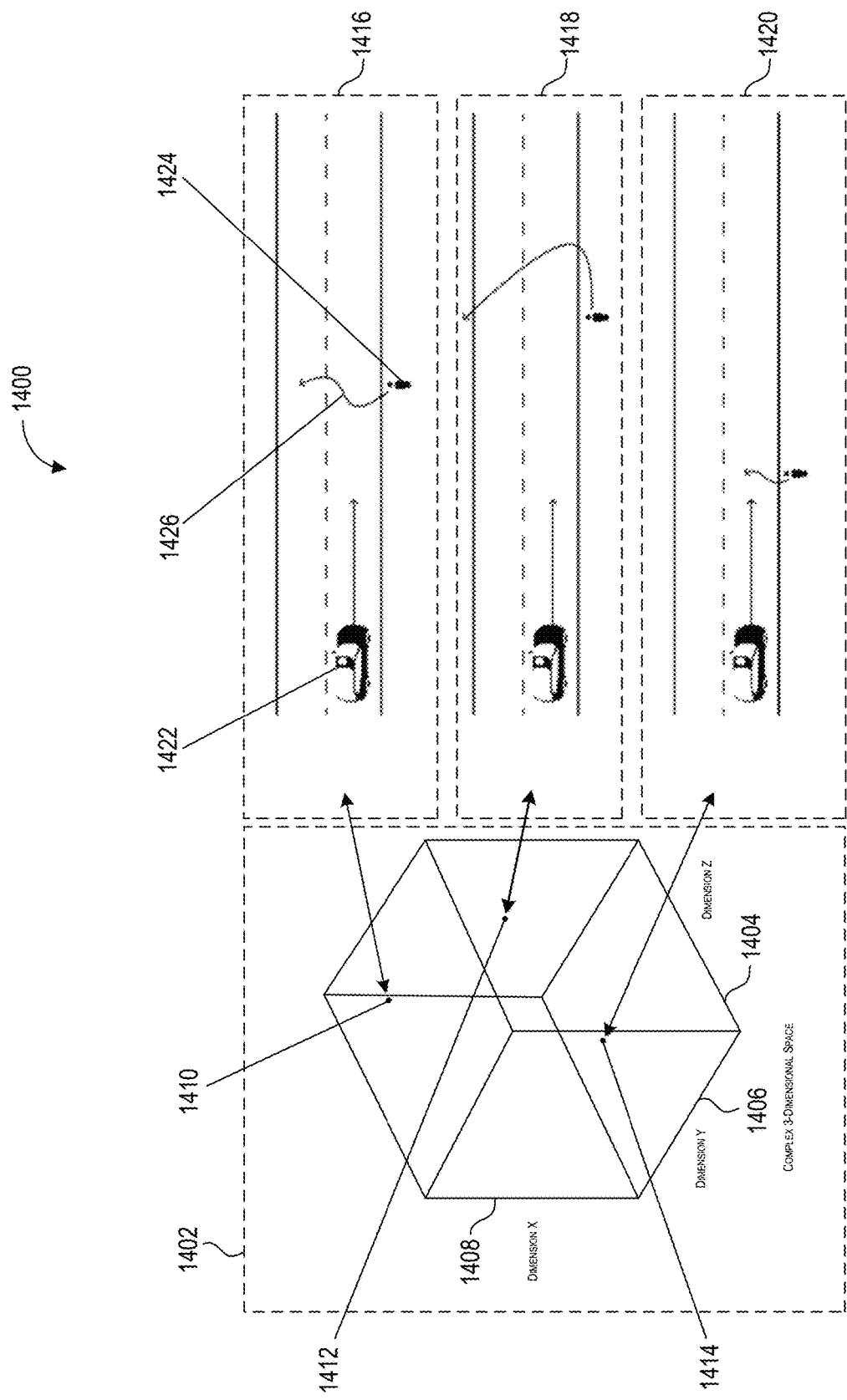
FIG. 14 depicts an example of determining the probability of future actions of an object in an environment according to example embodiments of the present disclosure.

FIG. 14 depicts an example of predicting the trajectory of an object in an environment according to example embodiments of the present disclosure. One or more operations and/or functions in FIG. 14 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 14 can include one or more features of one or more devices and/or systems including, for example, the operations computing system 104, the vehicle 108, or the vehicle computing system 112, which are depicted in FIG. 1.

As illustrated, FIG. 14 shows an example of a representation 1400 including a three-dimensional space 1402, a dimension 1404, a dimension 1406, a dimension 1408, a point 1410, a point 1412, a point 1414, a scenario 1416, a scenario 1418, a scenario 1420, an object 1422, an object 1424, and a predicted motion path 1426.

In this example, the three-dimensional space 1402 is used as part of the determination of the probability of predicted future actions of one or more objects in an environment. The potential future actions of the one or more objects in the environment can be represented by the two-dimensional space 1402 which includes the dimension 1404, the dimension 1406, and the dimension 1408 which can correspond to and/or be associated with different scenario modifiers. For example, the dimension 1404 can be associated with a minimum braking distance for a vehicle, the dimension 1406 can be associated with the distance to between a vehicle and an object, and the dimension 1408 can be associated with the velocity of the vehicle. The points 1410/1412/1414 can represent points on the three-dimensional space 1402 and can be associated with respective values of the dimension 1404, the dimension 1406, and the dimension 1408. For example, the point 1414 can be associated with a maximum braking velocity of thirty (30) meters of the object 1422 (e.g., an autonomous vehicle); a distance of thirty-five (35) meters between the object 1422 and the object 1424; and an object 1422 velocity of twenty-five (25) kilometer per hour. Further, the point 1414 can be associated with the actual state of a vehicle in an environment and can be used to determine various predicted motion paths of one or more objects in real-time as the vehicle traverses the environment. In this example, the point 1414 can be used as part of determining the scenario 1420, which is associated with a potential interaction between the object 1422 and the object 1424 in an environment including a road on which the object 1422 is travelling and a sidewalk on which the object 1424 is located. The scenario 1420 can be used to determine a speed profile, a velocity profile, a predicted trajectory, and/or a predicted motion path for the object 1424. For example, the scenario 1420 can be used to determine the predicted motion path 1426 of the object 1424. In contrast with the predicted trajectory 1326 that is depicted in FIG. 13, the predicted motion path 1426 can describe a more erratic motion path of the object 1424 which can include one or more changes in the direction of travel of the object 1424.

By way of further example, the point 1410 and the point 1412 can be associated with the scenario 1416 and the scenario 1418 respectively. Further, the scenario 1416 and the scenario 1418 can describe scenarios that are different from the scenario 1414, though some aspects of the scenario 1416 and the scenario 1418 can be similar or the same as that of the scenario 1414. For example, the braking capabilities of the object 1422 in the scenario 1418 can be the same as the braking capabilities of the object 1422 in the scenario 1414; and the distance between the object 1422 and the object 1424 can be different.

The representation 1400 depicted in FIG. 14 is one embodiments (the representation 1200 and the representation 1300 depicted in FIG. 12 and FIG. 13 represent other embodiments) of a representation of potential future actions of one or more objects in an environment. Further, although the representation 1400 includes a depiction of a three-dimensional space 1402, the representation 1400 can include any number of dimensions which can be positively correlated with scenario complexity. Further, the same number of dimensions can be used to represent different complexities of scenario based at least in part on the scenario modifiers associated with the respective dimensions. In some embodiments, dimensionality reduction can be positively correlated with the number of errors. The error associated with dimensionality reduction can be used when determining the validity and/or accuracy of the determined speed profile, velocity profile, trajectory, or predicted motion of an object.

Figure 15:
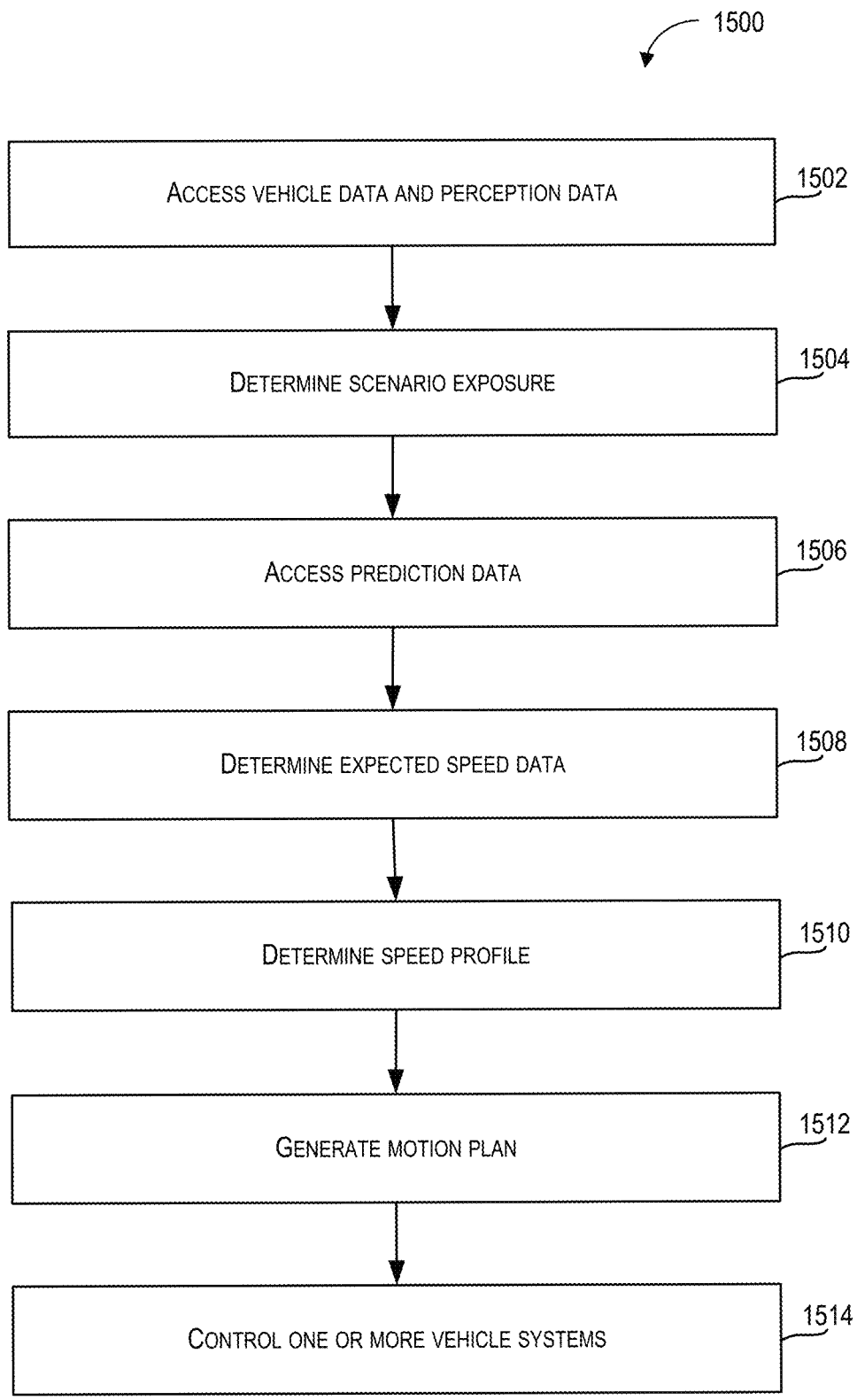
FIG. 15 depicts a flow diagram of an example of risk based vehicle control according to example embodiments of the present disclosure.

FIG. 15 depicts a flow diagram of an example of risk based vehicle control according to example embodiments of the present disclosure. One or more portions of a method 1500 can be implemented by one or more devices (e.g., one or more computing devices) or systems including, for example, the operations computing system 104, the vehicle 108, or the vehicle computing system 112, shown in FIG. 1. Moreover, one or more portions of the method 1500 can be implemented as an algorithm on the hardware components of the devices described herein (e.g., as in FIG. 1). FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1502, the method 1500 can include accessing, receiving, and/or obtaining vehicle data and perception data. The vehicle data can include information associated with the state of a vehicle including the velocity, acceleration, and/or speed of an autonomous vehicle in an environment. The perception data can include location information and/or classification information associated with an object in the environment. For example, the vehicle computing system 112 can access vehicle data that includes the speed, velocity, trajectory, and/or acceleration of the vehicle.

Further, the vehicle computing system 112 can access perception data including the location of the vehicle (e.g., latitude, longitude, altitude, and/or position of the vehicle relative to a point of reference or objects around the vehicle), the location of the object (e.g., the bearing, orientation, and/or distance of the object) relative to the vehicle; the object's current trajectory and/or speed/velocity; as well as the class of the object (e.g., that the object is a vehicle). The perception data can, for example, be generated and provided by the perception system 124 of the autonomous vehicle 108.

At 1504, the method 1500 can include determining and/or generating a scenario exposure. The scenario exposure can be based at least in part on the vehicle data and/or the perception data. The scenario exposure can represent a probability of a potential interaction between the autonomous vehicle and the object. For example, the vehicle computing system 112 can compare the vehicle data and/or the perception data to scenario exposure data that includes a plurality of look-up tables that can be used to determine the scenario exposure.

By way of further example, the vehicle computing system 112 can access scenario exposure data that includes information about the probability of potential interactions between the vehicle and particular classes of objects (e.g., other vehicles) at various speeds of the vehicle and at various distances between the vehicle and the object. The vehicle computing system 112 can then use the speed or velocity of the vehicle, the distance between the vehicle and the object, and the class of the object to determine the scenario exposure (e.g., at a velocity of fifteen (15) kilometers per hour, and a distance of forty meters from another vehicle has a scenario exposure of one (1) in every ten-thousand (10,000) instances).

At 1506, the method 1500 can include accessing, receiving, and/or obtaining prediction data. The prediction data can include one or more predicted trajectories for the object over a future time interval. In some embodiments, the prediction data can include one or more predicted trajectories of one or more hallucinated objects associated with one or more portions of the environment that are occluded. For example, the prediction system 126 of the computing system 112 can generate one or more hallucinated objects at locations that are occluded from the one or more sensors 114. Further, the prediction system 126 can generate one or more predicted trajectories for the one or more hallucinated objects that were generated.

For example, the vehicle computing system 112 can access prediction data generated by the prediction system 126. The prediction data can include predicted trajectories of the object over a future time interval that is the same duration as the estimated time for the vehicle to reach the object when the vehicle is travelling at the vehicle's current velocity. Furthermore, the predicted trajectories of the object can include predicted locations to which the object can travel based at least in part on the object's class (e.g., due to constraints on turning radius and maximum velocity, a cyclist can, within a fixed time interval, move to a different set of predicted locations than a motor vehicle).

At 1508, the method 1500 can include determining and/or generating expected speed data. The expected speed data can be determined based at least in part on (i) a plurality of hypothetical speeds of the autonomous vehicle and/or (ii) a plurality of hypothetical distances between the autonomous vehicle and the object. The expected speed data can include a plurality of expected speeds of the autonomous vehicle. Each expected speed of the plurality of expected speeds can represent a speed of the autonomous vehicle when the autonomous vehicle is at least a hypothetical distance from a predicted location of the object at a future time based at least in part on the prediction data.

The vehicle computing system 112 can determine a plurality of hypothetical speeds of the vehicle in a range from ten (10) kilometers per hour faster than the current speed of the vehicle to zero (0) kilometers per hour. The plurality of hypothetical speeds of the vehicle can include speeds at intervals of five (5) kilometers per hour (e.g., a vehicle travelling at ten (10) kilometers per hour could have a plurality of hypothetical speeds including fifteen (15) kilometers per hour, ten (10) kilometers per hour, five (5) kilometers per hour, and zero (0) kilometers per hour).

Further, the vehicle computing system 112 can determine a plurality of hypothetical distances between the vehicle and the object in a range from the current distance to the object to a distance when the vehicle intersects the object. The plurality of hypothetical distances at intervals of ten (10) meters (e.g., a vehicle thirty-five (35) meters from an object can have a plurality of hypothetical distances of thirty-five (35) meters, twenty-five (25) meters, fifteen (15) meters, and five (5) meters from the object).

At 1510, the method 1500 can include determining and/or generating a speed profile and/or velocity profile for a vehicle (e.g., an autonomous vehicle) over some distance. The speed profile and/or velocity profile can be based at least in part on (i) the scenario exposure, (ii) the prediction data, and/or (iii) the expected speed data. The speed profile and/or velocity profile that is determined can satisfy or be required to satisfy a set of threshold criteria. For example, the vehicle computing system 112 can determine a speed profile that includes a plurality of hypothetical distances each of which is associated with a respective hypothetical speed of the plurality of hypothetical speeds. For example, the vehicle computing system 112 can determine that distances of twenty-five (25) meters, fifteen (15) meters, and five (5) meters from the object, the vehicle can have a speed of up to thirty (30) kilometers per hour, twenty (20) kilometers per hour, and five (5) kilometers per hour in order to satisfy the threshold criteria of the maximum speed at which the vehicle can travel without contacting the object.

In some embodiments, the speed profile and/or the velocity profile can be associated with and/or include one or more trajectories of objects in an environment. For example, the vehicle computing system 112 can determine a trajectory for the vehicle 108 based at least in part on the predicted path that an object detected by the one or more sensors 114 is precited to traverse.

At 1512, the method 1500 can include generating a motion plan. The motion plan can be based at least in part on the speed profile and/or velocity profile. Further, the motion plan can be used to control one or more movements of the autonomous vehicle. For example, the vehicle computing system 112 can generate a motion plan that includes a plurality of locations to which the vehicle will travel at the speeds indicated in the speed profile. Further, the motion plan can include information associated with the orientation of the vehicle as the vehicle traverses the locations indicated in the motion plan. In some embodiments, the motion plan for the vehicle can include information associated with specific vehicle controls (e.g., steering and braking controls) that will be adjusted as the vehicle follows the motion plan.

At 1514, the method 1500 can include controlling one or more vehicle systems of the vehicle (e.g., autonomous vehicle) based at least in part on the motion plan. For example, the vehicle computing system 112 can use the motion plan to perform one or more operations to control one or more vehicle systems that are used to control the movement of the autonomous vehicle. For example, the vehicle computing system 112 can control the steering systems, motor systems, and/or braking systems of the autonomous vehicle to guide the autonomous vehicle to the plurality of locations indicated in the motion plan at the speeds and/or velocities indicated by the speed profile.

Figure 16:
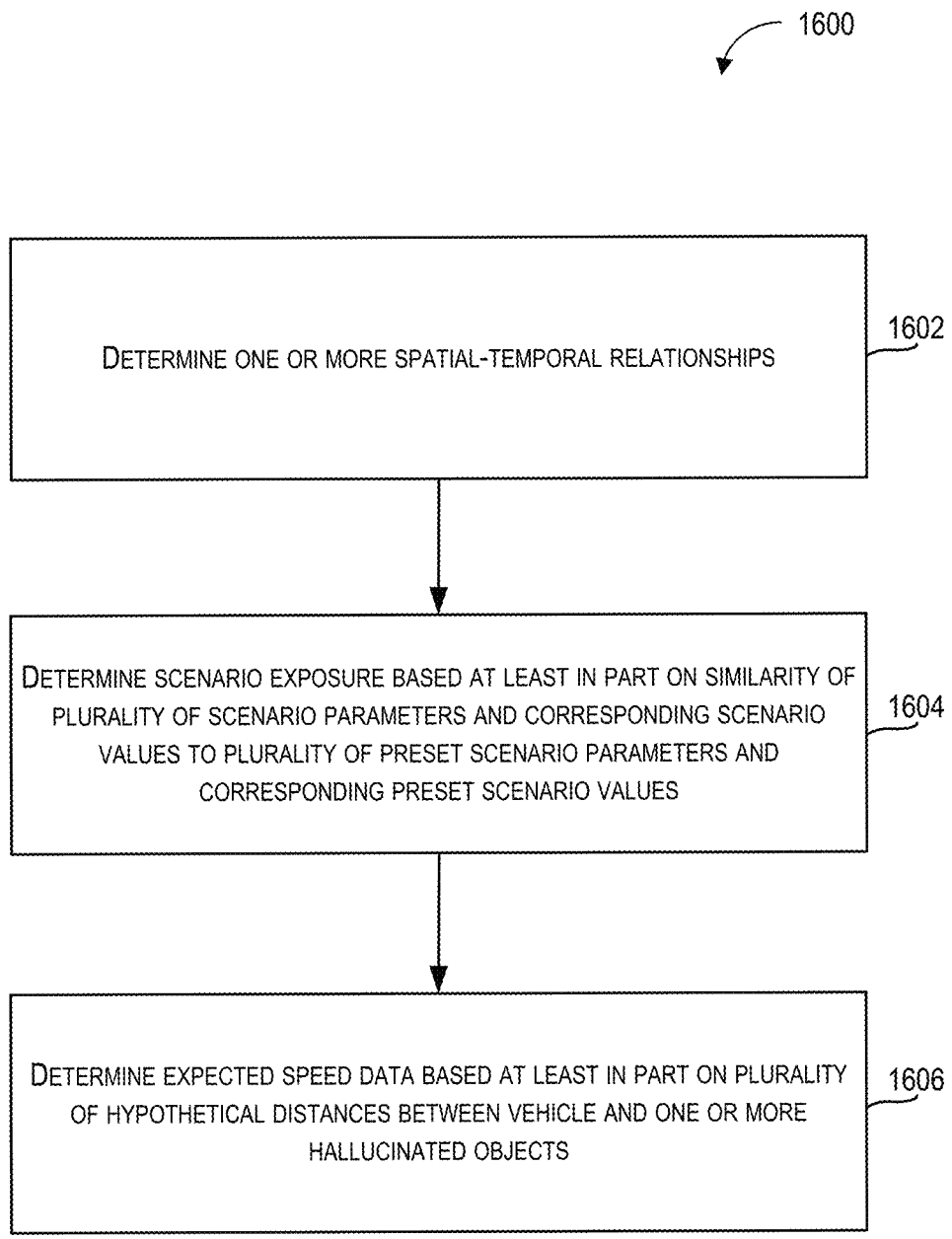
FIG. 16 depicts a flow diagram of an example of risk based vehicle control according to example embodiments of the present disclosure.

FIG. 16 depicts a flow diagram of an example of risk based vehicle control according to example embodiments of the present disclosure. One or more portions of a method 1600 can be implemented by one or more devices (e.g., one or more computing devices) or systems including, for example, the operations computing system 104, the vehicle 108, or the vehicle computing system 112, shown in FIG. 1. Moreover, one or more portions of the method 1600 can be implemented as an algorithm on the hardware components of the devices described herein (e.g., as in FIG. 1). In some embodiments, one or more portions of the method 1600 can be performed as part of the method 1500 that is depicted in FIG. 15. FIG. 16 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1602, the method 1600 can include determining one or more spatial-temporal relationships between the autonomous vehicle and the object. The one or more spatial-temporal relationships between the autonomous vehicle and the object can be based at least in part on the vehicle data and/or the perception data. Further, the one or more spatial-temporal relationships can be associated with a plurality of scenario parameters and/or corresponding scenario values.

By way of example, the vehicle computing system 112 can access the vehicle data to determine the velocity of the vehicle 108 and access the perception data to determine the distance of an object from the vehicle 108.

By way of further example, the vehicle computing system 112 can determine one or more spatial-temporal relationships based at least in part on the plurality of scenario parameters and corresponding scenario values associated with the vehicle data and/or the perception data. For example, the vehicle data can include a scenario parameter for vehicle velocity and a corresponding scenario value of forty (40) kilometers per hour to indicate that the vehicle is travelling at a velocity of forty (40) kilometers per hour.

At 1604, the method 1600 can include determining the scenario exposure based at least in part on a similarity of the plurality of scenario parameters and corresponding scenario values to a respective plurality of preset scenario parameters and corresponding preset scenario values. For example, the vehicle computing system 112 can determine the similarity between the plurality of scenario parameters and corresponding scenario values and the respective plurality of preset scenario parameters and corresponding preset scenario values by comparing the distance between the vehicle and the object; and the respective velocities of the vehicle and the object, to corresponding preset scenario parameters and corresponding scenario values that are included in one or more look-up tables that are part of scenario exposure data associated with the scenario exposure.

At 1606, the method 1600 can include determining the expected speed data based at least in part on a plurality of hypothetical distances between the autonomous vehicle and at least one of the one or more hallucinated objects (e.g., the one or more hallucinated objects of the prediction data described at 1506 of the method 1500 that is depicted in FIG. 15).

For example, the vehicle computing system 112 can determine a plurality of hypothetical speeds of the vehicle in a range from the current speed of the vehicle to zero (0) kilometers per hour. The plurality of hypothetical speeds of the vehicle can include speeds at intervals of five (5) kilometers per hour (e.g., a vehicle travelling at fifteen (15) kilometers per hour would have a plurality of hypothetical speeds including fifteen (15) kilometers per hour, ten (10) kilometers per hour, five (5) kilometers per hour, and zero (0) kilometers per hour). Further, the vehicle computing system 112 can determine a plurality of hypothetical distances between the vehicle and the one or more hallucinated objects in a range from the current distance to the object to a distance when the vehicle intersects the one or more hallucinated objects. The plurality of hypothetical distances at intervals of ten (10) meters (e.g., a vehicle thirty-five (35) meters from the one or more hallucinated object can have a plurality of hypothetical distances of thirty-five (35) meters, twenty-five (25) meters, fifteen (15) meters, and five (5) meters from the object).

Figure 17:
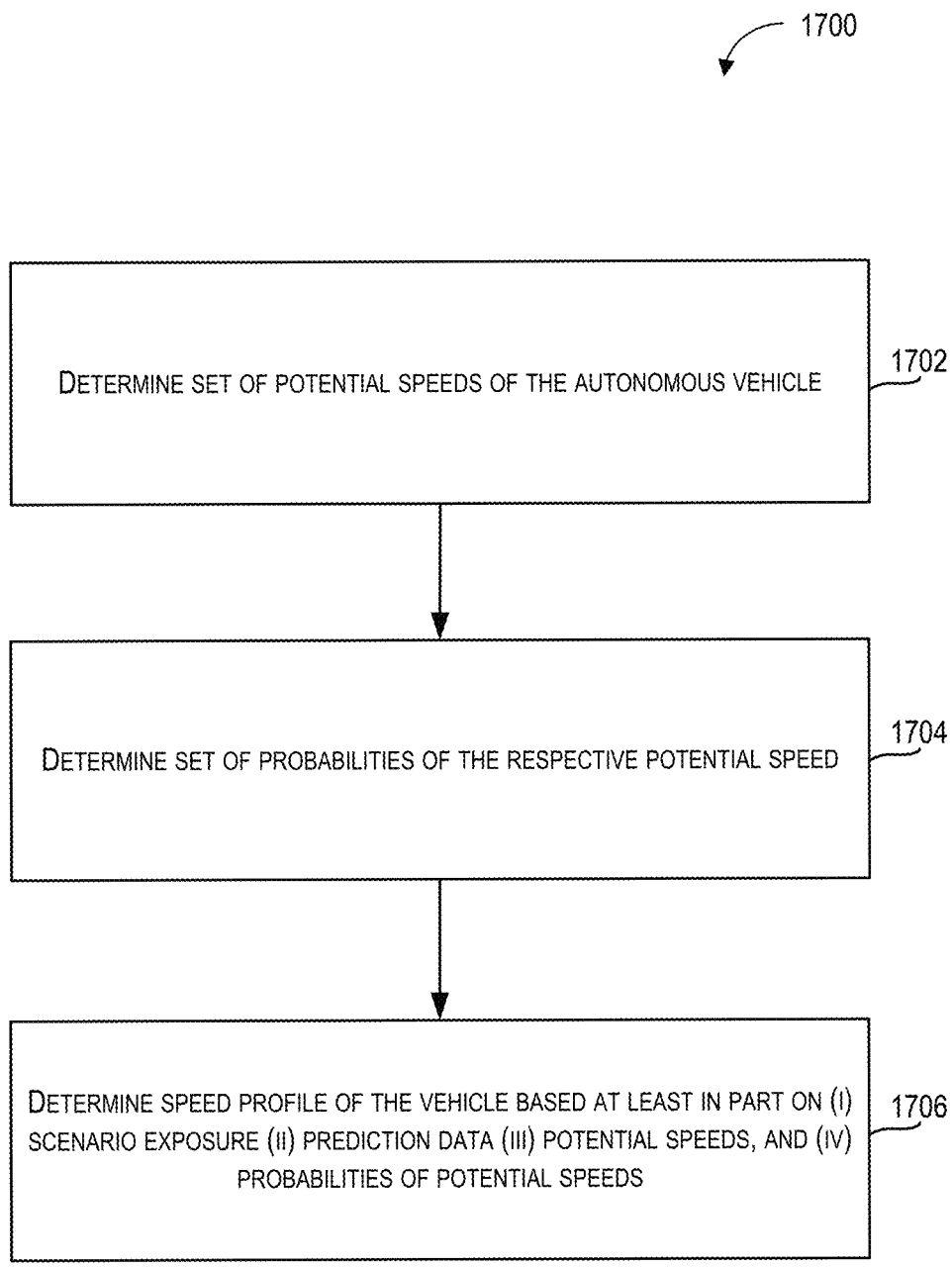
FIG. 17 depicts a flow diagram of an example of risk based vehicle control according to example embodiments of the present disclosure.

FIG. 17 depicts a flow diagram of an example of risk based vehicle control according to example embodiments of the present disclosure. One or more portions of a method 1700 can be implemented by one or more devices (e.g., one or more computing devices) or systems including, for example, the operations computing system 104, the vehicle 108, or the vehicle computing system 112, shown in FIG. 1. Moreover, one or more portions of the method 1700 can be implemented as an algorithm on the hardware components of the devices described herein (e.g., as in FIG. 1). In some embodiments, one or more portions of the method 1700 can be performed as part of the method 1500 that is depicted in FIG. 15. FIG. 17 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1702, the method 1700 can include, for each combination of a subset of combinations between (i) the plurality of expected speeds of the autonomous vehicle and (ii) the plurality of hypothetical distances between the autonomous vehicle and the object: determining a set of potential speeds of the autonomous vehicle upon traveling a respective hypothetical distance.

For example, the vehicle computing system 112 can determine a set of combinations of the plurality of expected speeds and the plurality of hypothetical distances such that each of the plurality of hypothetical distances from the current location of the vehicle to a location at which the vehicle intersects the object is associated with a respective set of potential speeds.

At 1704, the method 1700 can include, for each combination of a subset of combinations between (i) the plurality of expected speeds of the autonomous vehicle and (ii) the plurality of hypothetical distances between the autonomous vehicle and the object: for each potential speed of the set of potential speeds, determining a set of probabilities of the respective potential speed causing a corresponding set of possible outcomes from the potential interaction between the autonomous vehicle and the object.

For example, the vehicle computing system 112 can, for each of the set of potential speeds including speeds of thirty (30) kilometers per hour, twenty (20) kilometers per hour, and ten (10) kilometers per hour, at a distance of ten meters from an object determine that at a speed of thirty (30) kilometers per hour there is a seventy-five percent (75%) probability of a potential interaction involving contact with the object, at a speed of twenty (20) kilometers per hour there is a thirty percent (30%) probability of a potential interaction involving contact with the object, and that at a speed of ten (10) kilometers per hour there is a two percent (2%) probability of a potential interaction involving contact with the object.

At 1706, the method 1700 can include, for each combination of a subset of combinations between (i) the plurality of expected speeds of the autonomous vehicle and (ii) the plurality of hypothetical distances between the autonomous vehicle and the object: determining the speed profile for the autonomous vehicle based at least in part on (i) the scenario exposure, (ii) the prediction data, (iii) the potential speeds, and (iv) the probabilities of the potential speeds causing possible outcomes from the potential interaction between the autonomous vehicle and the object.

Using the scenario exposure, the prediction data, the potential speeds, and/or the probabilities of the potential speeds causing possible outcomes from the potential interaction between the autonomous vehicle and the object, the vehicle computing system 112 can, for example, determine the speed profile for the autonomous vehicle. Further, the vehicle computing system 112 can determine a speed profile that allows the vehicle to travel at the maximum speed that is associated with a probability of potentially interacting with an object that is lower than the probability associated with the scenario exposure.

Figure 18:
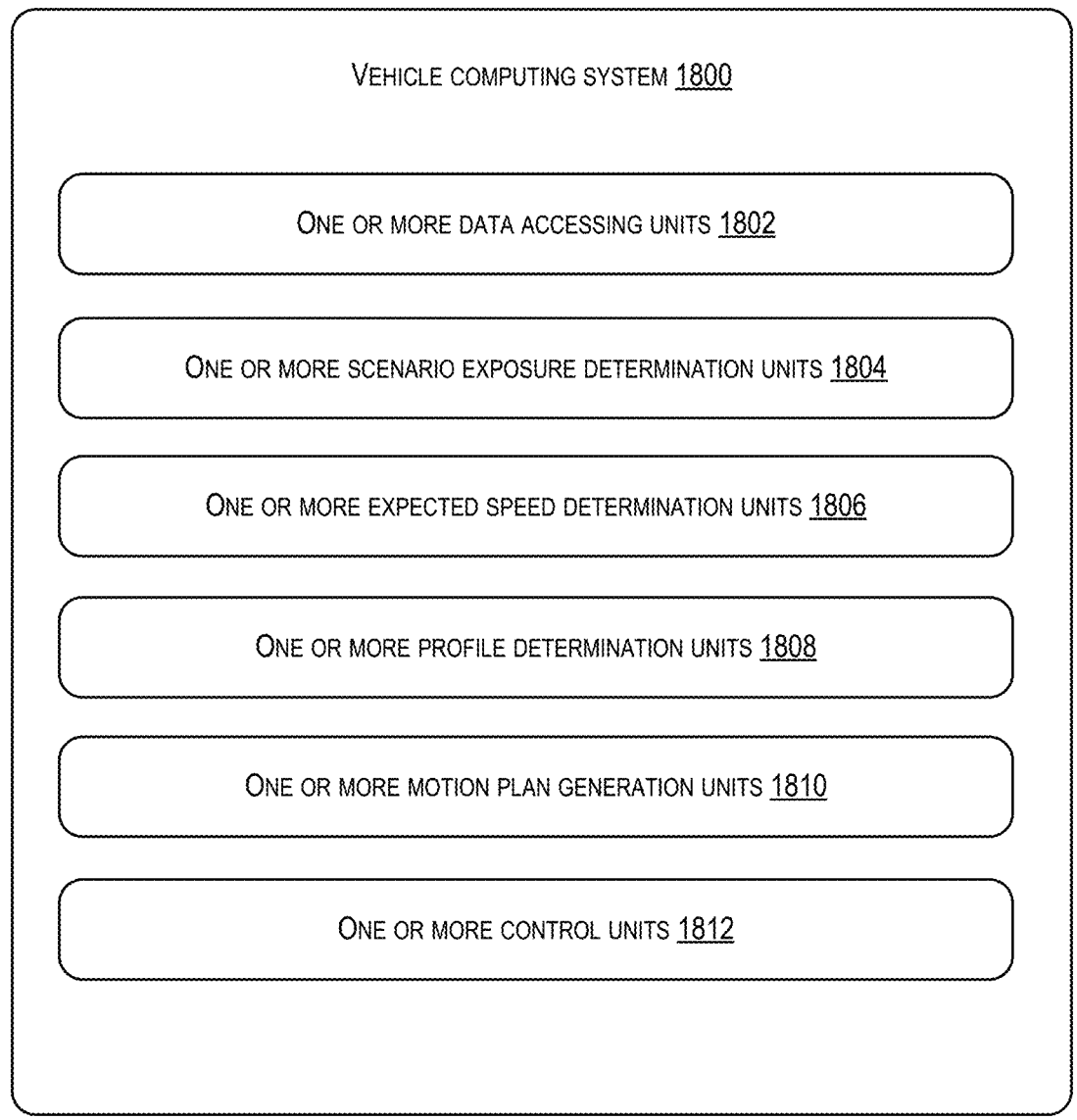
FIG. 18 depicts a diagram of an example system according to example embodiments of the present disclosure.

FIG. 18 depicts a diagram of an example system according to example embodiments of the present disclosure. One or more operations and/or functions in FIG. 18 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 18 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a vehicle computing system can include one or more data accessing units 1802, one or more scenario exposure determination units 1804, one or more expected speed data determination units 1806, one or more motion profile determination units 1808, one or more motion plan generation units 1810, one or more control units 1812, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a vehicle computing system) or configured (e.g., an ASIC custom designed and configured to operate a vehicle computing system) to perform one or more algorithms for performing the operations and functions described herein. For example, the means (e.g., the one or more data accessing units 1802) can be configured to access vehicle data and/or perception data. The vehicle data can include information associated with a speed and/or velocity of a vehicle in an environment. The perception data can include location information and classification information associated with an object in the environment.

The means (e.g., the one or more data accessing units 1802) can be configured to access prediction data including one or more predicted trajectories for the object over a future time interval. In some embodiments, the prediction data can include one or more predicted trajectories of one or more hallucinated objects associated with one or more portions of the environment that are occluded.

The means (e.g., the one or more scenario exposure determination units 1804) can be configured to determine a scenario exposure based at least in part on the vehicle data and/or the perception data. The scenario exposure can include and/or represent a probability of a potential interaction between the vehicle and the object.

In some embodiments, the means (e.g., the one or more scenario exposure determination units 1804) can be configured to determine, based at least in part on the vehicle data and the perception data, one or more spatial-temporal relationships between the autonomous vehicle and the object. The one or more spatial-temporal relationships can be associated with a plurality of scenario parameters and corresponding scenario values.

In some embodiments, the means (e.g., the one or more scenario exposure determination units 1804) can be configured to determine the scenario exposure based at least in part on a similarity of the plurality of scenario parameters and corresponding scenario values to a respective plurality of preset scenario parameters and corresponding preset scenario values.

The means (e.g., the one or more expected speed data determination units 1806) can be configured to determine and/or generate expected speed data. The expected speed data can be determined based at least in part on (i) a plurality of hypothetical speeds of the autonomous vehicle and/or (ii) a plurality of hypothetical distances between the autonomous vehicle and the object. The expected speed data can include a plurality of expected speeds of the vehicle. Each expected speed can represent a speed of the vehicle when the vehicle is at least a hypothetical distance from a predicted location of the object at a future time based at least in part on the prediction data.

The means (e.g., the one or more profile determination units 1808) can be configured to determine based at least in part on (i) the scenario exposure, (ii) the prediction data, and/or (iii) the expected speed data, a speed profile for the vehicle over a distance. The speed profile can satisfy a set of threshold criteria.

In some embodiments, the means (e.g., the one or more profile determination units 1808) can be configured to determine a maximum speed at which the autonomous vehicle will not contact the object.

In some embodiments, the means (e.g., the one or more profile determination units 1808) can be configured to determine whether the vehicle cannot avoid contacting the object.

In response to determining that the vehicle cannot avoid contacting the object, the means (e.g., the one or more profile determination units 1808) can be configured to determine a travel path of the vehicle that will minimize a severity of the potential interaction between the vehicle and the object.

In some embodiments, the means (e.g., the one or more profile determination units 1808) can be configured to, for each combination of a subset of combinations between (i) the plurality of expected speeds of the autonomous vehicle and (ii) the plurality of hypothetical distances between the autonomous vehicle and the object, determine a set of potential speeds of the autonomous vehicle upon traveling a respective hypothetical distance.

Further, in some embodiments, the means (e.g., the one or more profile determination units 1808) can be configured to, for each potential speed of the set of potential speeds, determine a set of probabilities of the respective potential speed causing a corresponding set of possible outcomes from the potential interaction between the autonomous vehicle and the object.

Further, in some embodiments, the means (e.g., the one or more profile determination units 1808) can be configured to determine the speed profile for the autonomous vehicle based at least in part on (i) the scenario exposure, (ii) the prediction data, (iii) the potential speeds, and (iv) the probabilities of the potential speeds causing possible outcomes from the potential interaction between the autonomous vehicle and the object.

The means (e.g., the one or more motion plan data generation units 1810) can be configured to generate a motion plan for controlling a movement of the vehicle.

The means (e.g., the one or more control units 1812) can be configured to control one or more vehicle systems of an autonomous vehicle based at least in part on the motion plan.

Figure 19:
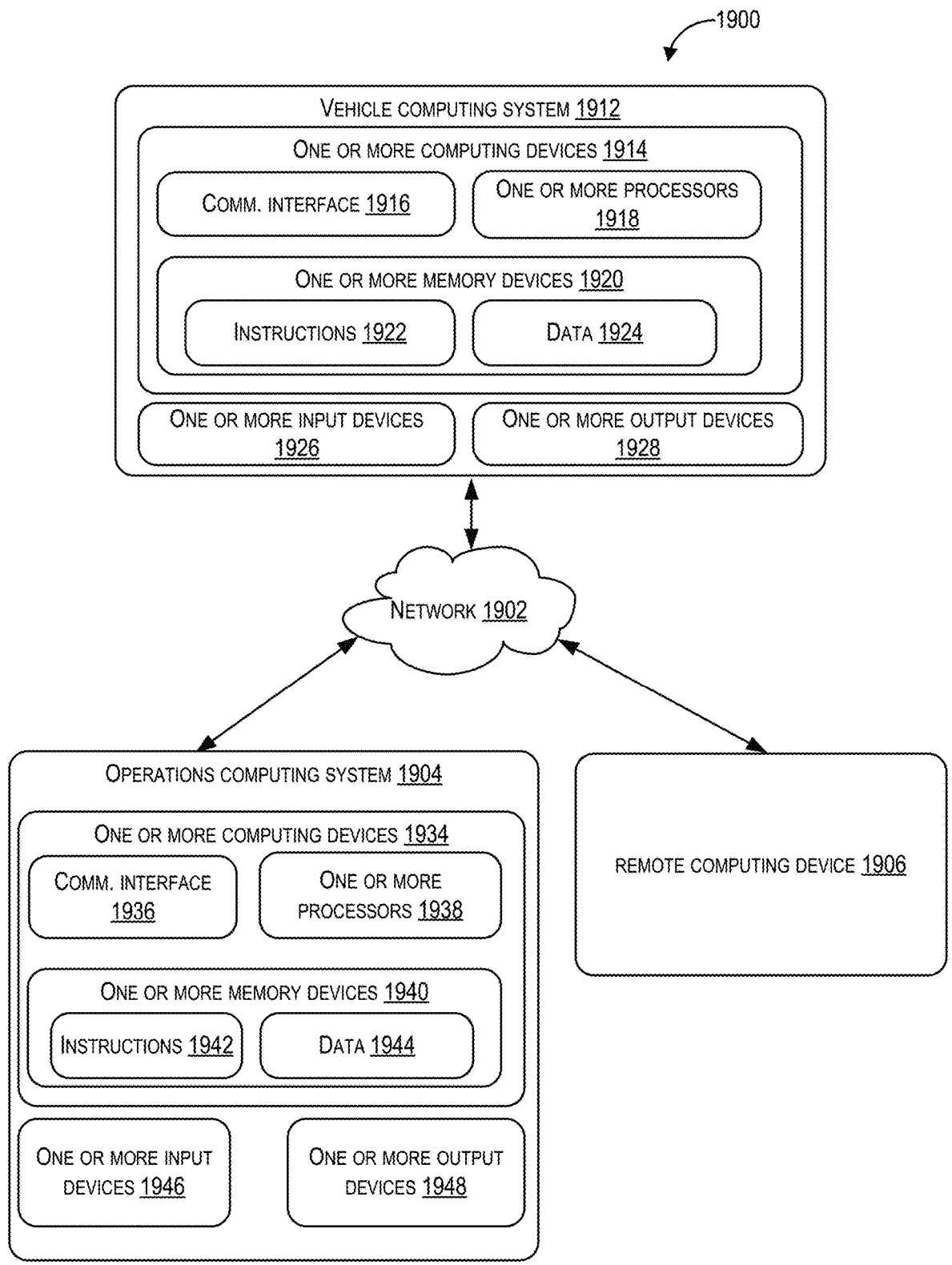
FIG. 19 depicts a diagram of an example system according to example embodiments of the present disclosure.

FIG. 19 depicts a diagram of an example system according to example embodiments of the present disclosure. A system 1900 can include a network 1902 which can include one or more features of the communications network 102 depicted in FIG. 1; an operations computing system 1904 which can include any of the attributes and/or capabilities of the operations computing system 104 depicted in FIG. 1; a remote computing device 1906 which can include any of the attributes and/or capabilities of the one or more remote computing devices 106 depicted in FIG. 1; a vehicle computing system 1912 which can include any of the attributes and/or capabilities of the vehicle computing system 112 depicted in FIG. 1; one or more computing devices 1914; a communication interface 1916; one or more processors 1918; one or more memory devices 1920; computer-readable instructions 1922; data 1924; one or more input devices 1926; one or more output devices 1928; one or more computing devices 1934; a communication interface 1936; one or more processors 1938; one or more memory devices 1940; computer-readable instructions 1942; data 1944; one or more input devices 1946; and one or more output devices 1948.

The vehicle computing system 1912 can include the one or more computing devices 1914. The one or more computing devices 1914 can include one or more processors 1918 which can be included on-board a vehicle including the vehicle 108 and one or more memory devices 1920 which can be included on-board a vehicle including the vehicle 108. The one or more processors 1918 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1918 can include a single processor or a plurality of processors that are operatively and/or selectively connected. The one or more memory devices 1920 can include one or more non-transitory computer-readable storage media, including RAM, ROM, EEPROM, EPROM, flash memory devices, magnetic disks, and/or combinations thereof.

The one or more memory devices 1920 can store data or information that can be accessed by the one or more processors 1918. For instance, the one or more memory devices 1920 which can be included on-board a vehicle including the vehicle 108, can include computer-readable instructions 1922 that can store computer-readable instructions that can be executed by the one or more processors 1918. The computer-readable instructions 1922 can include software written in any programming language that can be implemented in hardware (e.g., computing hardware). Further, the computer-readable instructions 1922 can include instructions that can be executed in logically and/or virtually separate threads on the one or more processors 1918. The computer-readable instructions 1922 can include any set of instructions that when executed by the one or more processors 1918 cause the one or more processors 1918 to perform operations.

For example, the one or more memory devices 1920 which can be included on-board a vehicle (e.g., the vehicle 108) can store instructions, including specialized instructions, that when executed by the one or more processors 1918 on-board the vehicle cause the one or more processors 1918 to perform operations including any of the operations and functions of the one or more computing devices 1914 or for which the one or more computing devices 1914 are configured, including the operations described herein including operating an autonomous device which can include an autonomous vehicle.

The one or more memory devices 1920 can include the data 1924 that can include data that can be retrieved, manipulated, created, and/or stored by the one or more computing devices 1914. The data stored in the data 1924 can include any of the data described herein, including the vehicle data, the perception data, the prediction data, the expected speed data, data associated with a scenario exposure, data expected with a speed profile or velocity profile, the sensor data, the training data, and any data associated with operation of an autonomous device which can include an autonomous vehicle. For example, the data 1924 can include data associated with an autonomy system of an autonomous vehicle including a perception system, a prediction system, and/or a motion planning system.

The data 1924 can be stored in one or more databases. The one or more databases can be split up so that the one or more databases are located in multiple locales on-board a vehicle which can include the vehicle 108. In some implementations, the one or more computing devices 1914 can obtain data from one or more memory devices that are remote from a vehicle, including, for example the vehicle 108.

The system 1900 can include the network 1902 (e.g., a communications network) which can be used to send and/or receive signals (e.g., electronic signals) or data (e.g., data from a computing device) including signals or data exchanged between computing devices including the operations computing system 1904, and/or the vehicle computing system 1912. The network 1902 can include any combination of various wired (e.g., twisted pair cable) and/or wireless communication mechanisms (e.g., cellular, wireless, satellite, microwave, and radio frequency) and/or any desired network topology (or topologies). For example, the communications network 1902 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1914 can also include the communication interface 1916 used to communicate with one or more other systems which can be included on-board a vehicle including the vehicle 108 (e.g., over the network 1902). The communication interface 1916 can include any suitable components for interfacing with one or more networks, including for example, transmitters, receivers, ports, controllers, antennas, other hardware and/or software.

The vehicle computing system 1912 can also include one or more input devices 1926 and/or one or more output devices 1928. The one or more input devices 1926 and/or the one or more output devices 1928 can be included and/or otherwise associated with a human-machine interface system. The one or more input devices 1926 can include, for example, hardware for receiving information from a user, including a touch screen, touch pad, mouse, data entry keys, speakers, and/or a microphone that can be configured to detect and/or receive sounds in an environment and/or to be suitable for voice recognition.

The one or more output devices 1928 can include one or more display devices (e.g., organic light emitting diode (OLED) display, liquid crystal display (LCD), microLED display, or CRT) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices (e.g., a touch sensitive display device) and/or the audio output devices. Further, the one or more output devices 1928 can include one or more audio output devices (e.g., loudspeakers) that can be configured to generate and/or transmit sounds.

The operations computing system 1904 can include the one or more computing devices 1934. The one or more computing devices 1934 can include the communication interface 1936, the one or more processors 1938, and the one or more memory devices 1940. The one or more computing devices 1934 can include any of the attributes and/or capabilities of the one or more computing devices 1914. The one or more memory devices 1940 can store the instructions 1942 and/or the data 1944 which can include any of the attributes and/or capabilities of the instructions 1922 and data 1924 respectively.

For example, the one or more memory devices 1940 can store instructions, including specialized instructions, that when executed by the one or more processors 1938 on-board the vehicle cause the one or more processors 1938 to perform operations including any of the operations and functions of the one or more computing devices 1934 or for which the one or more computing devices 1934 are configured, including the operations described herein including accessing vehicle and perception data; determining a scenario exposure based at least in part on the vehicle data including the speed of a vehicle in an environment and/or the perception data including location information and classification information associated with an object in the environment; accessing prediction data associated with one or more predicted trajectories for the object over a future time interval; determining expected speed data including a plurality of expected speeds of a vehicle; determining a speed profile for the vehicle; and generating a motion plan for controlling movement of the vehicle.

The one or more memory devices 1940 can include the data 1944 that can store data that can be retrieved, manipulated, created, and/or stored by the one or more computing devices 1934. The data stored in the data 1944 can include any of the data described herein including the vehicle data, the perception data, the prediction data, the expected speed data, data associated with a scenario exposure, data expected with a speed profile or velocity profile, the sensor data, and/or the training data.

Furthermore, the operations computing system 1904 can include the one or more input devices 1946 and/or the one or more output devices 1948, which can include any of the attributes and/or capabilities of the one or more input devices 1926 and/or the one or more output devices 1928.

The remote computing device 1906 can include any of the attributes and/or capabilities of the operations computing system 1904 and/or the vehicle computing system 1912. For example, the remote computing device can include a communications interface, one or more processors, one or more memory devices, one or more input devices, and/or one or more output devices. Further, the remote computing device 1906 can include one or more devices including: a telephone (e.g., a smart phone), a tablet, a laptop computer, a computerized watch (e.g., a smart watch), computerized eyewear (e.g., an augmented reality headset), computerized headwear, and/or other types of computing devices. Furthermore, the remote computing device 1906 can communicate (e.g., send and/or receive data and/or signals) with one or more systems and/or devices including the operations computing system 1904 and/or the vehicle computing system 1912 via the communications network 1902. In some embodiments, the operations computing system 1904 described herein can also be representative of a user device that can be included in the human machine interface system of a vehicle including the vehicle 108.

The technology discussed herein makes reference to computing devices, databases, software applications, and other computer-based systems, as well as actions taken and information sent to and/or from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Data and/or instructions can be implemented on a single system or distributed across multiple systems. Distributed components can operate sequentially or in parallel.

Furthermore, computing tasks discussed herein as being performed at computing devices remote from the vehicle can instead be performed at the vehicle (e.g., via the vehicle computing system). Such configurations can be implemented without deviating from the scope of the present disclosure. The use of computer-based systems allows for a great variety of different possible configurations, combinations, and/or divisions of tasks and functionality between and/or among components. Computer-implemented tasks and/or operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autonomous vehicle control, the computer-implemented method comprising:
   accessing, by a computing system comprising one or more computing devices, vehicle data and perception data, wherein the vehicle data comprises a speed of an autonomous vehicle in an environment, and wherein the perception data comprises location information and classification information associated with an object in the environment;
   determining, by the computing system, a scenario exposure based at least in part on the vehicle data and the perception data, wherein the scenario exposure represents a probability of a potential interaction between the autonomous vehicle and the object;
   accessing, by the computing system, prediction data comprising one or more predicted trajectories for the object over a future time interval;
   determining, by the computing system and based at least in part on (i) a plurality of hypothetical speeds of the autonomous vehicle and (ii) a plurality of hypothetical distances between the autonomous vehicle and the object, expected speed data comprising a plurality of expected speeds of the autonomous vehicle, wherein each expected speed represents a speed of the autonomous vehicle when the autonomous vehicle is at least a hypothetical distance from a predicted location of the object at a future time based at least in part on the prediction data;
   determining, by the computing system and based at least in part on (i) the scenario exposure, (ii) the prediction data, and (iii) the expected speed data, a speed profile for the autonomous vehicle over a distance, wherein the speed profile satisfies a set of threshold criteria; and
   generating, by the computing system and based on the speed profile, a motion plan for controlling a movement of the autonomous vehicle.

2. The computer-implemented method of claim 1, wherein the determining, by the computing system, the scenario exposure based at least in part on the vehicle data and the perception data, wherein the scenario exposure represents a probability of the probability of the potential interaction between the autonomous vehicle and the object comprises:
   determining, by the computing system, based at least in part on the vehicle data and the perception data, one or more spatial-temporal relationships between the autonomous vehicle and the object, wherein the one or more spatial-temporal relationships are associated with a plurality of scenario parameters and corresponding scenario values; and
   determining, by the computing system, the scenario exposure based at least in part on a similarity of the plurality of scenario parameters and corresponding scenario values to a respective plurality of preset scenario parameters and corresponding preset scenario values.

3. The computer-implemented method of claim 2, wherein the plurality of preset scenario parameters and the corresponding preset scenario values are based at least in part on a plurality of actual events involving a plurality of different spatial-temporal relationships or a plurality of different velocities between one or more vehicles, one or more pedestrians, or one or more cyclists, and wherein the plurality of actual events occur in a plurality of different environments comprising one or more different road surface types.

4. The computer-implemented method of claim 2, wherein the plurality of preset scenario parameters and the corresponding preset scenario values are based at least in part on a plurality of different vehicle capabilities comprising at least one of one or more vehicle braking capabilities or one or more vehicle turning capabilities.

5. The computer-implemented method of claim 1, wherein the prediction data comprises one or more predicted trajectories of one or more hallucinated objects associated with one or more portions of the environment that are occluded; and further comprising:
   determining, by the computing system, the expected speed data based at least in part on a plurality of hypothetical distances between the autonomous vehicle and at least one of the one or more hallucinated objects.

6. The computer-implemented method of claim 1, wherein the classification information is based at least in part on one or more outputs from one or more machine-learning models configured to classify the object based at least in part on the perception data.

7. The computer-implemented method of claim 1, wherein the autonomous vehicle comprises one or more portions, each portion associated with a respective zone representing a different severity of the potential interaction between the autonomous vehicle and the object.

8. The computer-implemented method of claim 7, wherein the severity of potential interaction of the one or more portions of the autonomous vehicle that are closer to a direction of travel of the autonomous vehicle are associated with a zone representing a severity of potential interaction that is greater than the severity of potential interaction represented by a zone associated with one or more portions of the autonomous vehicle that are further away from the direction of travel of the autonomous vehicle.

9. The computer-implemented method of claim 7, wherein the one or more portions of the autonomous vehicle that are located at a front side of the autonomous vehicle are associated with a zone representing a severity of potential interaction that is greater than the severity of potential interaction represented by a zone associated with the one or more portions of the autonomous vehicle that do not include the front side of the autonomous vehicle.

10. The computer-implemented method of claim 1, wherein the set of threshold criteria comprises the autonomous vehicle not contacting the object or the autonomous vehicle not coming within a threshold distance of the object.

11. The computer-implemented method of claim 1, wherein the determining, by the computing system and based at least on (i) the scenario exposure, (ii) the prediction data, and (iii) the expected speed data, the speed profile for the autonomous vehicle over the distance, wherein the speed profile satisfies the set of threshold criteria comprises:

determining, by the computing system, a maximum speed at which the autonomous vehicle will not contact the object.

12. The computer-implemented method of claim 1, wherein determining, based at least in part on (i) the scenario exposure, (ii) the prediction data, and (iii) the expected speed data, the speed profile for the autonomous vehicle comprises:
for each combination of a subset of combinations between (i) the plurality of expected speeds of the autonomous vehicle and (ii) the plurality of hypothetical distances between the autonomous vehicle and the object:
determining, by the computing system, a set of potential speeds of the autonomous vehicle upon traveling a respective hypothetical distance; and
for each potential speed of the set of potential speeds, determining, by the computing system, a set of probabilities of the respective potential speed causing a corresponding set of possible outcomes from the potential interaction between the autonomous vehicle and the object; and
determining, by the computing system, the speed profile for the autonomous vehicle based at least in part on (i) the scenario exposure, (ii) the prediction data, (iii) the potential speeds, and (iv) the probabilities of the potential speeds causing possible outcomes from the potential interaction between the autonomous vehicle and the object.

13. The computer-implemented method of claim 1, wherein the motion plan comprises information associated with a maximum speed of the autonomous vehicle at one or more portions of the future time interval.

14. The computer-implemented method of claim 1, wherein the motion plan comprises information associated with one or more paths for the autonomous vehicle to traverse during the future time interval.

15. A computing system comprising:
one or more processors;
a memory comprising one or more tangible non-transitory computer-readable media, the memory storing computer-readable instructions that when executed by the one or more processors cause the computing system to perform operations comprising:
accessing vehicle data and perception data, wherein the vehicle data comprises a speed of an autonomous vehicle in an environment, and wherein the perception data comprises location information and classification information associated with an object in the environment;
determining a scenario exposure based at least in part on the vehicle data and the perception data, wherein the scenario exposure represents a probability of a potential interaction between the autonomous vehicle and the object;
accessing prediction data comprising one or more predicted trajectories for the object over a future time interval;
determining, based at least in part on (i) a plurality of hypothetical speeds of the autonomous vehicle and (ii) a plurality of hypothetical distances between the autonomous vehicle and the object, expected speed data comprising a plurality of expected speeds of the autonomous vehicle, wherein each expected speed represents a speed of the autonomous vehicle when the autonomous vehicle is at least a hypothetical distance from a predicted location of the object at a future time based at least in part on the prediction data;
determining, based at least in part on (i) the scenario exposure, (ii) the prediction data, and (iii) the expected speed data, a speed profile for the autonomous vehicle over a distance, wherein the speed profile satisfies a set of threshold criteria; and
generating, based at least in part on the speed profile, a motion plan for controlling a movement of the autonomous vehicle.

16. The computing system of any of claim 15, wherein the object is a vehicle, a pedestrian, or a cyclist.

17. The computing system of claim 15, wherein the one or more predicted trajectories are based at least in part on one or more outputs of a motion prediction system of the autonomous vehicle.

18. An autonomous vehicle comprising:
one or more processors;
a memory comprising one or more tangible non-transitory computer-readable media, the memory storing computer-readable instructions that when executed by the one or more processors cause the one or more processors to perform operations comprising:
accessing vehicle data and perception data, wherein the vehicle data comprises a speed of an autonomous vehicle in an environment, and wherein the perception data comprises location information and classification information associated with an object in the environment;
determining a scenario exposure based at least in part on the vehicle data and the perception data, wherein the scenario exposure represents a probability of a potential interaction between the autonomous vehicle and the object;
accessing prediction data comprising one or more predicted trajectories for the object over a future time interval;
determining, based at least in part on (i) a plurality of hypothetical speeds of the autonomous vehicle and (ii) a plurality of hypothetical distances between the autonomous vehicle and the object, expected speed data comprising a plurality of expected speeds of the autonomous vehicle, wherein each expected speed represents a speed of the autonomous vehicle when the autonomous vehicle is at least a hypothetical distance from a predicted location of the object at a future time based at least in part on the prediction data;
determining, based at least in part on (i) the scenario exposure, (ii) the prediction data, and (iii) the expected speed data, a speed profile for the autonomous vehicle over a distance, wherein the speed profile satisfies a set of threshold criteria; and
generating, based at least in part on the speed profile, a motion plan for controlling a movement of the autonomous vehicle.

19. The autonomous vehicle of claim 18, wherein the expected speed data is based at least in part on a reaction and braking profile associated with a braking capability of the autonomous vehicle, and wherein the braking capability of the autonomous vehicle comprises an amount of time between when the autonomous vehicle detects the object and when the autonomous vehicle brakes.

20. The autonomous vehicle of claim 18, further comprising:
controlling one or more vehicle systems of the autonomous vehicle based at least in part on the motion plan.

* * * * *